(12) United States Patent
Morita et al.

(10) Patent No.: US 9,434,792 B2
(45) Date of Patent: *Sep. 6, 2016

(54) MODIFIED CONJUGATED DIENE RUBBER, METHOD FOR PRODUCING SAME, AND RUBBER COMPOSITION

(75) Inventors: Hiroyuki Morita, Tokyo (JP); Masahiro Shibata, Tokyo (JP); Ryoji Tanaka, Tokyo (JP)

(73) Assignee: JSR CORPORATION, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 14/114,123

(22) PCT Filed: Apr. 17, 2012

(86) PCT No.: PCT/JP2012/060362
§ 371 (c)(1),
(2), (4) Date: Oct. 25, 2013

(87) PCT Pub. No.: WO2012/147565
PCT Pub. Date: Nov. 1, 2012

(65) Prior Publication Data
US 2014/0051799 A1    Feb. 20, 2014

(30) Foreign Application Priority Data

Apr. 26, 2011  (JP) ................. 2011-098186

(51) Int. Cl.
| | |
|---|---|
| *B60C 1/00* | (2006.01) |
| *C08C 19/25* | (2006.01) |
| *C08C 19/44* | (2006.01) |
| *C08L 15/00* | (2006.01) |
| *C08K 3/04* | (2006.01) |
| *C08K 3/36* | (2006.01) |

(52) U.S. Cl.
CPC ............... *C08C 19/25* (2013.01); *B60C 1/00* (2013.01); *B60C 1/0016* (2013.04); *C08C 19/44* (2013.01); *C08K 3/04* (2013.01); *C08K 3/36* (2013.01); *C08L 15/00* (2013.01)

(58) Field of Classification Search
CPC ........... C08K 3/04; C08K 3/36; C08L 15/00; C08C 19/25; C08C 19/44; B60C 1/00; B60C 1/0016
See application file for complete search history.

(56) References Cited

U.S. PATENT DOCUMENTS

| | | |
|---|---|---|
| 2004/0254301 A1 | 12/2004 | Tsukimawashi et al. |
| 2005/0020757 A1 | 1/2005 | Ozawa et al. |
| 2005/0203251 A1 | 9/2005 | Oshima et al. |
| 2013/0023623 A1 | 1/2013 | Nakamura et al. |

FOREIGN PATENT DOCUMENTS

| | | |
|---|---|---|
| EP | 2 554 553 A1 | 6/2013 |
| JP | 2004 18795 | 1/2004 |
| JP | 2004 168903 | 6/2004 |
| JP | 2005 290355 | 10/2005 |
| JP | 2008 285558 | 11/2008 |
| JP | 2009 132907 | 6/2009 |
| JP | 2009 155394 | 7/2009 |
| WO | 03 048216 | 6/2003 |
| WO | 2011 030833 | 3/2011 |
| WO | 2011 049180 | 4/2011 |
| WO | 2011 125698 | 10/2011 |
| WO | 2011 155326 | 12/2011 |

OTHER PUBLICATIONS

Extended European Search Report issued Nov. 13, 2014 in Patent Application No. 12777672.2.
International Search Report Issued Jul. 17, 2012 in PCT/JP12/60362 Filed Apr. 17, 2012.

*Primary Examiner* — Peter D Mulcahy
(74) *Attorney, Agent, or Firm* — Oblon, McClelland, Maier & Neustadt, L.L.P.

(57) ABSTRACT

A method containing a step of reacting a conjugated diene polymer having an alkali metal or alkaline earth metal active end with a hydrocarbyloxysilane compound having one or more of each of the following functional groups I and II in its molecule to obtain a modified conjugated diene polymer containing a functional group II, and a step of mixing the modified conjugated diene polymer and a compound such as organic acid. A modified conjugated diene rubber which can be used as a raw material of a cross-linked rubber which can be used in tire treads and the like and can enhance low fuel consumption performance is provided. The functional group I is a hydrocarbyloxysilyl group. The functional group II is a nitrogen-containing group in which both of two hydrogen atoms of a primary amino group are substituted with protective groups.

16 Claims, No Drawings

MODIFIED CONJUGATED DIENE RUBBER, METHOD FOR PRODUCING SAME, AND RUBBER COMPOSITION

TECHNICAL FIELD

The present invention relates to a modified conjugated diene rubber, a method for producing the same and a rubber composition containing the modified conjugated diene rubber. More particularly, the present invention relates to a method for producing a modified conjugated diene rubber capable of producing a cross-linked rubber which is excellent in workability, tensile strength, wear resistance, wet skid resistance and low hysteresis loss properties, a modified conjugated diene rubber which is excellent in shape-retaining properties obtained by such a production method, a rubber composition containing the modified conjugated diene rubber, and a cross-linked rubber (for example, a vulcanized rubber) obtained by cross-linking (for example, vulcanizing) the rubber composition.

BACKGROUND ART

As rubbers for automobile tires, conjugated diene rubbers (for example, styrene-butadiene copolymers) obtained by emulsion polymerization methods have been known. In recent years, it has been expected to improve low fuel consumption performance of automobiles, and various conjugated diene rubbers capable of realizing excellent low fuel consumption performance have been proposed.

As an example, there have been proposed a conjugated diolefin (co)polymerized rubber characterized in (1) being a (co)polymer rubber of a conjugated diolefin or a conjugated diolefin and an aromatic vinyl compound, (2) having a primary amino group and an alkoxysilyl group bonded to a (co)polymer chain, and (3) that a bifunctional or more monomer is copolymerized in the (co)polymer chain, and/or that at least a part of the (co)polymer chain is coupled with a bifunctional or more coupling agent; and a rubber composition containing the conjugated diolefin (co)polymer (Patent Document 1).

As another example, there have been proposed a modified diene polymer rubber obtained from a step 1 of polymerizing a conjugated diene monomer or a conjugated diene monomer and an aromatic vinyl monomer in a hydrocarbon solvent in the presence of an alkali metal catalyst to obtain an active polymer having an alkali metal end, and a step 2 of reacting the active polymer with a compound represented by a specific formula to obtain a modified polymer rubber; and a rubber composition containing the modified diene polymer rubber (Patent Document 2).

Further, as a method for producing a modified polymer capable of promoting interactions with silica and carbon black and improving fracture characteristics, wear resistance and low exothermic properties, there have been proposed a method of performing a primary modification reaction in which a hydrocarbyloxysilane compound is reacted with a polymer having organometallic active sites in its molecule, at the active sites, and then performing a secondary modification reaction in which the hydrocarbyloxysilane compound is reacted through a condensation reaction of hydrocarbyloxysilyl groups with each other; and a rubber composition containing the modified polymer obtained by the method (Patent Document 3).

PRIOR-ART DOCUMENTS

Patent Documents

Patent Document 1: JP-A-2004-18795
Patent Document 2: JP-A-2005-290355
Patent Document 3: WO 03/048216 A1

SUMMARY OF THE INVENTION

Problems to be Solved by the Invention

As described above, various conjugated diene rubbers capable of realizing excellent low fuel consumption performance of automobiles and the rubber compositions using the conjugated diene rubber have been proposed. However, under financial circumstances such as a price increase of gasoline and environmental circumstances including carbon dioxide emissions, it has been expected to realize further low fuel consumption of automobiles. Then, an object of the present invention is to provide a method for producing a modified conjugated diene rubber usable as a raw material of a cross-linked rubber that can be used for use in automobile tires and the like and can enhance low fuel consumption performance of automobiles and the like.

Means for Solving the Problems

In order to solve the above-mentioned problems, the inventors of the present invention have made intensive studies. As a result, it has been found that the above-mentioned object can be achieved when a modified conjugated diene rubber is produced by reacting a conjugated diene polymer having an alkali metal or alkaline-earth metal active end with a specific hydrocarbyloxysilane compound, and then, mixing a modified conjugated diene polymer as a reaction product and at least one selected from the group consisting of organic acid compounds and organic acid derivatives to produce a modified conjugated diene rubber, thus completing the present invention.

Namely, the present invention provides the following [1] to [8]:

[1] A method for producing a modified conjugated diene rubber comprising:

a step (a) of reacting a conjugated diene polymer having an alkali metal or alkaline-earth metal active end, which is obtained by polymerizing a conjugated diene compound or a conjugated diene compound and an aromatic vinyl compound with a hydrocarbyloxysilane compound having one or more of each of the following functional groups (I) and (II) in its molecule to obtain a modified conjugated diene polymer containing a functional group (II), and a step (b) of mixing the modified conjugated diene polymer obtained in the step (a) and one or more selected from the group consisting of organic acid compounds and organic acid derivatives to obtain the modified conjugated diene rubber.

Functional group (I): A hydrocarbyloxysilyl group
Functional group (II): A nitrogen-containing group in which both of two hydrogen atoms of a primary amino group are substituted with protective groups

[2] The method for producing a modified conjugated diene rubber according to the above [1], wherein the organic acid compounds and the organic acid derivatives are carboxylic acids, carboxylic acid derivatives, organic phosphoric (phosphorous) acids, organic phosphoric (phosphorous) acid derivatives, organic sulfonic acids, organic sulfonic acid derivatives, organic sulfinic acids, organic sulfinic acid derivatives and organic thio acids.

[3] The method for producing a modified conjugated diene rubber according to the above [1] or [2], further comprising a step (c) of bringing the modified conjugated diene rubber obtained in the step (b) into contact with water.

[4] The method for producing a modified conjugated diene rubber according to any one of the above [1] to [3], wherein the modified conjugated diene rubber has an onium structure formed by the modified conjugated diene polymer.

[5] A modified conjugated diene rubber obtained by the method for producing a modified conjugated diene rubber according to any one of the above [1] to [4].

[6] A rubber composition comprising the modified conjugated diene rubber according to the above [5], silica and/or carbon black and a cross-linking agent.

[7] A cross-linked rubber obtained by cross-linking the rubber composition according to the above [6].

[8] A tire comprising the cross-linked rubber according to the above [7].

Effects of the Invention

According to a production method of the present invention, it is possible to obtain a modified conjugated diene rubber which is excellent in shape-retaining properties, which is capable of producing a cross-linked rubber excellent in workability, tensile strength, wear resistance, wet skid resistance and low hysteresis loss properties.

The cross-linked rubber produced by using the above-mentioned modified conjugated diene rubber is excellent in wear resistance and low hysteresis loss properties, so that low fuel consumption performance of automobiles and the like can be improved by using it for use in automobile tires and the like.

MODE FOR CARRYING OUT THE INVENTION

A method for producing a modified conjugated diene rubber of the present invention comprises a step (a) of reacting a conjugated diene polymer having an alkali metal or alkaline-earth metal active end, which is obtained by polymerizing a conjugated diene compound or a conjugated diene compound and an aromatic vinyl compound, with a hydrocarbyloxysilane compound having one or more of each of the following functional groups (I) and (II) in its molecule to obtain a modified conjugated diene polymer containing a functional group (II), and a step (b) of mixing the modified conjugated diene polymer obtained in the step (a) and one or more selected from the group consisting of organic acid compounds and organic acid derivatives to obtain a modified conjugated diene rubber.

Functional group (I): A hydrocarbyloxysilyl group

Functional group (II): A nitrogen-containing group in which both of two hydrogen atoms of a primary amino group are substituted with protective groups

[1] Method for Producing Modified Conjugated Diene Rubber:

[Step (a)]

The step (a) is a step of reacting a conjugated diene polymer having an alkali metal or alkaline-earth metal active end, which is obtained by polymerizing a conjugated diene compound or a conjugated diene compound and an aromatic vinyl compound, with a hydrocarbyloxysilane compound having one or more of each of functional groups (I) and (II) described later in its molecule to obtain a modified conjugated diene polymer containing a functional group (II).

The conjugated diene polymer having an alkali metal or alkaline-earth metal active end includes an anionic polymer obtained by polymerizing a conjugated diene compound alone or by copolymerizing a conjugated diene compound and an aromatic vinyl compound.

There is no particular limitation on the method for producing a conjugated diene polymer, except for performing anionic polymerization with an alkali metal- or alkaline-earth metal-based polymerization initiator (hereinafter also referred to as a "polymerization initiator), as described above. For example, any of a solution polymerization method, a vapor-phase polymerization method and a bulk polymerization method can be used as the polymerization method. In particular, it is preferred to use a solution polymerization method. Further, the type of polymerization may be either a batch type or a continuous type. Furthermore, a metal atom of an active site present in a molecule of the conjugated diene polymer is an alkali metal or an alkaline-earth metal, preferably lithium, sodium, potassium, magnesium or barium, and particularly preferably lithium. All these alkali metals or alkaline-earth metals have the similar action, from the viewpoint that it is possible to obtain the conjugated diene polymer having the metal active end reactable with the hydrocarbyloxysilane compound, and therefore, even one not described in Examples described later can be used in the present invention.

Further, it is also effective to mix a functional group-containing monomer, followed by activating functional groups in the polymer with an alkali metal-based initiator. For example, it is also effective to lithiate functional group moieties of a copolymer containing isobutylene units, para-methylstyrene units or para-halogenated methylstyrene units to form active sites.

As the above-mentioned conjugated diene compounds (hereinafter also referred to as "conjugated diene monomers"), preferred are, for example, 1,3-butadiene, isoprene, 2,3-dimethyl-1,3-butadine, 1,3-pentadiene, 1,3-hexadiene, 1,3-heptadiene, 2,3-dimethylbutadiene, 2-phenyl-1,3-butadiene, 3-methyl-1,3-pentadiene, 1,3-hexadiene, 2-chloro-1,3-butadine and the like. These may be used either alone or as a combination of two or more thereof. Of these compounds, particularly preferred are 1,3-butadine, isoprene, 2,3-dimethyl-1,3-butadiene and the like. All these conjugated diene monomers have the similar action, from the viewpoint that it is possible to obtain the conjugated diene polymer having the metal active end reactable with the hydrocarbyloxysilane compound, and therefore, even one not described in Examples described later can be used in the present invention.

As the above-mentioned organic vinyl compounds, for example, styrene, vinyl toluenes (for example, 2-methylstyrene, 3-methylstyrene and 4-methylstyrene), α-methylstyrene, vinylxylenes (for example, 2,4-dimethylstyrene), 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminomethylstyrene, N,N-dimethylaminoethylstyrene, 2-ethylstyrene, 3-ethylstyrene, 4-ethylstyrene, 2-t-butylstyrene, 3-t-butylstyrene, 4-t-butylstyrene, vinylnaphthalene, vinylpyridine, diphenylethylene, tertiary amino group-containing diphenylethylene and the like are preferable. These may be used either alone or as a combination of two or more thereof. Of these compounds, styrene is particularly preferred. All these aromatic vinyl compounds have the similar action, from the viewpoint that it is possible to obtain the conjugated diene polymer having the metal active end reactable with the hydrocarbyloxysilane compound, and therefore, even one which is not described in Examples described later can be used in the present invention.

Further, when copolymerization is performed using the conjugated diene monomer and the aromatic vinyl compound, it is preferred to use 1,3-butadiene and styrene, respectively. These monomers are not only easily available but also excellent in terms of high living properties in the anionic polymerization. Furthermore, when the solution polymerization method is used, the monomer concentration in a solvent is preferably from 5 to 50% by mass, and more preferably from 10 to 30% by mass, from the viewpoint of maintaining a balance between productivity and easiness of polymerization control. In this connection, when copolymerization is performed using the conjugated diene monomer and the aromatic vinyl compound, the content of the aromatic vinyl compound in a monomer mixture charged is preferably from 3 to 55% by mass, and more preferably from 5 to 50% by mass, from the viewpoint of maintaining a balance between low hysteresis loss properties and wet skid resistance of a cross-linked rubber composition to be obtained.

Compounds used as the above-mentioned alkali metal or alkaline-earth metal based polymerization initiators include alkyl lithiums, alkylene dilithiums, lithium alkyleneimides, lithium dialkylamides, phenyl lithium, stilbene lithium, lithium naphthalene, sodium naphthalene, potassium naphthalene, n-butyl magnesium, n-hexyl magnesium, ethoxy calcium, calcium stearate, t-butoxy strontium, ethoxy barium, isopropoxy barium, ethylmercaptobarium, t-butoxy barium, phenoxy barium, diethyl-aminobarium, barium stearate, ketyl barium, sodium biphenyl, potassium-tetrahydrofuran complex, potassium-diethoxyethane complex, and sodium salt of α-methylstyrene tetramer and the like. Above all, organolithium compounds such as alkyl lithiums and lithium amide compounds such as lithium alkylene imides are preferable. When the organolithium compound is used, a conjugated diene polymer which has a hydrocarbon group at a polymerization initiation end, and in which the other end is a polymerization active site is obtained. Further, when the lithium amide compound is used, a conjugated diene polymer that has a nitrogen-containing group at a polymerization initiation end, and in which the other end is a polymerization active site is obtained. All these alkali metal- or alkaline-earth metal-based polymerization initiators have the similar action, from the viewpoint that it is possible to obtain the conjugated diene polymer having the metal active end reactable with the hydrocarbyloxysilane compound, and therefore, even one not described in Examples described later can be used in the present invention.

As the above-mentioned organolithium compound, one having a hydrocarbon group with 1 to 20 carbon atoms is preferable. Examples thereof include methyl lithium, ethyl lithium, n-propyl lithium, iso-propyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, a reaction product of diisopropenylbenzene and butyl lithium, t-butyl lithium, n-hexyl lithium, benzyl lithium, phenyl lithium, stilbene lithium, 1,4-dilithiobutane, 1,3,5-trilithiobenzene, a reactant of n-butyl lithium, 1,3-butadiene and divinylbenzene, a reactant of n-butyl lithium and polyacetylene, 4-cyclopentyl lithium, 1,2-dilithiomethane, 1,4-dilithiobutane, 1,4-dilithio-2-ethylcylohexane, 1,3,5-trilithiobenzene and the like. Of these, n-butyl lithium and sec-butyl lithium are preferable from the viewpoint of easy availability and high polymerization initiating ability.

On the other hand, the lithium amide compounds include, for example, lithium hexamethyleneimide, lithium pyrrolidide, lithium piperidide, lithium heptamethyleneimide, lithium dodecamethyleneimide, lithium morphilide, lithium dimethylamide, lithium diethylamide, lithium dibutylamide, lithium dipropylamide, lithium diisopropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, 3-[N,N-bis(trimethylsilyl)]-1-propyl lithium, 3-[N,N-bis(trimethylsilyl)]-2-methyl-1-propyl lithium, 3-N,N-bis(trimethylsilyl)]-2,2-dimethyl-1-propyl lithium, 4-[N,N-bis(trimethylsilyl)]-1-butyl lithium, 5-[N,N-bis(trimethylsilyl)-1-pentyl lithium, 8-[N,N-bis(trimethylsilyl)-1-octyl lithium, 3-(2,2,5,5-tetramethyl-2,5-disila-1-azacyclopentane)-1-propyl lithium, 2-methyl-3-(2,2,5,5-tetramethyl-2,5-disila-1-azacyclopentane)-1-propyl lithium, 2,2-dimethyl-3-(2,2,5,5-tetramethyl-2,5-disila-1-azacyclopentane)-1-propyl lithium, 4-(2,2,5,5-tetramethyl-2,5-disila-1-azacyclopentane)-1-butyl lithium, 6-(2,2,5,5-tetramethyl-2,5-disila-1-azacyclopentane)-1-hexyl lithium and the like. Of these, cyclic lithium amides such lithium hexamethyleneimide, lithium pyrrolidide, lithium piperidide, lithium heptamethyleneimide and lithium dodecamethyleneimide are preferred, from the viewpoint of interaction effects to carbon black and silica and high polymerization initiating ability. Above all, lithium hexamethyleneimide, lithium pyrrolidide and lithium piperidide are particularly preferred.

For these lithium amide compounds, ones previously prepared from secondary amines and lithium compounds are generally used as the polymerization initiator in many cases. However, the compounds can also be prepared in polymerization systems (in situ). Further, the amount of this polymerization initiator used is preferably selected within the range of 0.2 to 20 mmoles per 100 g of monomer.

Specific methods for producing the conjugated diene polymer by the anionic polymerization using the above-mentioned lithium compound as the polymerization initiator include, for example, a method of subjecting the conjugated diene monomer or the conjugated diene monomer and the aromatic vinyl compound to the anionic polymerization in a reaction-inactive organic solvent, for example, in a hydrocarbon solvent such as an aliphatic, alicyclic or aromatic hydrocarbon compound, using the above-mentioned lithium compound as the polymerization initiator in the presence of a randomizer used as desired. The intended conjugated diene polymer can be obtained by such a method.

The above-mentioned hydrocarbon solvent is preferably one having 3 to 8 carbon atoms. Examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene and the like. These may be used either alone or as a combination of two or more thereof.

Further, the randomizer (vinyl content adjuster) used as desired means a compound having an action of controlling a microstructure of the conjugated diene polymer, for example, increasing vinyl bonds (1,2-bonds) of butadiene moieties in a butadiene-styrene copolymer or vinyl bonds (1,2-bonds and 3,4-bonds) in an isoprene polymer, or controlling composition distribution of monomer units in the conjugated diene polymer, for example, randomizing butadiene units and styrene units in a butadiene-styrene copolymer. This randomizer has no particular limitation, and any one can be appropriately selected from known compounds generally used as the randomizer and used. Specifically, the randomizers include ethers, tertiary amines and the like such as dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1,2-dipiperidinoethane, ethylene glycol dibutyl ether, ethylene glycol dimethyl ether, diethyl ether, dioxane, trimethylamine, quinuclidine, potassium-t-amylate, potassium-t-butylate, triphenylphosphine, tetrahydropyran, dibutyl ether, ethylene glycol diethyl ether, diethylene glycol diethyl ether, diphenyl ether, anisole, tripropylamine, tributylamine, N,N-diethylaniline and quinoline. These randomizers may be used either alone or as a combination of two or more thereof.

When reactivity of the above-mentioned polymerization initiator is intended to be improved, or when the aromatic vinyl compound introduced into the polymer is intended to be randomly arranged or a simple chain or a long chain of the aromatic vinyl compound is intended to be given, a potassium compound may be added together with the polymerization initiator. The potassium compounds added together with the polymerization initiator include, for example, potassium alkoxides or potassium phenoxides represented by potassium isoproxide, potassium t-butoxide, potassium t-amyloxide, potassium n-heptaoxide, potassium benzyloxide and potassium phenoxide; potassium salts of isovalerianic acid, caprylic acid, lauric acid, palmitic acid, stearic acid, oleic acid, linolenic acid, benzoic acid, phthalic acid, 2-ethylhexanoic acid and the like; potassium salts of organic sulfonic acids such as dodecylbenzenesulfonic acid, tetradecylbenzenesulfonic acid, hexadecylbenzenesulfonic acid and octadecylbenzenesulfonic acid; potassium salts of partial esters of organic phosphorous acids such as diethyl phosphite, diisopropyl phosphite, diphenyl phosphite, dibutyl phosphite and dilauryl phosphite; and the like.

The amount of these potassium compounds added is preferably from 0.005 to 0.5 moles per gram atom equivalent of the alkali metal or alkaline-earth metal of the polymerization initiator. When the amount is less than 0.005 moles, the addition effect (the improvement in reactivity of the polymerization initiator, or the randomization or the giving of the simple chain or long chain of the aromatic vinyl compound) of the potassium compound sometimes does not appear. When the amount exceeds 0.5 moles, not only polymerization activity is decreased, resulting in a significant reduction in productivity, but also modification efficiency in the modification reaction with the hydrocarbyloxysilane compound is sometimes decreased.

The temperature in this polymerization reaction is preferably from −20 to 150° C., and more preferably from 0 to 120° C. The polymerization reaction can be carried out under generated pressure, and it is usually preferred to perform operations under pressure enough to substantially keep the monomer(s) in a liquid phase. Namely, a higher pressure compared to the generated pressure can be used if desired, although it depends on the individual substances to be polymerized, the polymerization medium used and the polymerization temperature. Such a pressure can be obtained by an appropriate method such as pressurization of a reaction vessel with a gas that is inactive with respect to the polymerization reaction.

As all raw materials relating to this polymerization, such as the polymerization initiator, the solvent and the monomer(s), there are preferably used ones from which reaction-inhibiting substances such as water, oxygen, carbon dioxide and protonic compounds are removed. In this connection, when the polymer is obtained as an elastomer, the glass transition temperature (Tg) of the polymer or copolymer obtained, which is determined by a differential thermal analysis method, is preferably from −90 to 0° C. It is difficult to obtain the polymer having a glass transition temperature of less than −90° C. Additionally, when the temperature exceeds 0° C., the viscosity thereof becomes too high in the region of room temperature, which sometimes result in a difficulty of handling.

At least one hydrocarbyloxy group as functional group (I) of the hydrocarbyloxysilane compound is only required to be present in its molecule. Further, the hydrocarbyloxysilyl group is preferably one having two or more hydrocarbyloxy groups from the viewpoint of reactivity with the conjugated diene polymer having the alkali metal or alkaline-earth metal active end. When two or more hydrocarbyloxy groups are present, these may be the same or different.

Preferable examples of the hydrocarbyloxysilyl groups include an alkoxysilyl group having an alkyl group with 1 to 20 carbon atoms, an aryloxysilyl group having an aryl group with 1 to 20 carbon atoms, an allyloxysilyl group having an allyl group with 1 to 20 carbon atoms, an aralkyloxysilyl group having an aralkyl group with 1 to 20 carbon atoms, and the like.

The nitrogen-containing group as the functional group (II) of the hydrocarbyloxysilane compound, in which both of two hydrogen atoms of a primary amino group are substituted with protective groups, is a group substituted with the protective groups in order to prevent a reaction with the alkali metal or alkaline-earth metal active end of the conjugated diene polymer, and a group capable of becoming an onium by an action of the organic acid compound or the organic acid derivative after deprotection. At least one kind of the group capable of becoming an onium is only required to be present in its molecule. Further, when two or more functional groups (II) are present, these functional groups may be the same or different.

Furthermore, the hydrocarbyloxysilane compounds may be used either alone or as a combination of two or more thereof.

The compounds having the nitrogen-containing group in which both of two hydrogen atoms of a primary amino group are substituted with protective groups and the hydrocarbyloxysilyl group include, for example, N,N-bis(trimethylsilyl)amino -propylmethyldimethoxysilane, N,N-bis(trimethylsilyl)aminopropyltrimethoxysilane, N,N-bis(trimethylsilyl)aminopropyltriethoxysilane, N,N -bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldi -methoxysilane, N,N-bis(trimethylsilyl)aminoethylmethyldiethoxysilane, N,N-bis(triethylsilyl)aminopropylmethyldimethoxysilane, N,N -bis(triethylsilyl)aminopropyltri-ethoxysilane, N,N-bis(triethylsilyl)aminopropyltriethoxysilane, N,N-bis(triethylsilyl)aminopropylmethyldiethoxysilane, N,N-bis(triethylsilyl)aminoethyltrimethoxysilane, N,N -bis(triethylsilyl)aminoethyltriethoxysilane,N,N -bis(triethylsilyl)aminoethylmethyldimethoxysilane,N,N -bis(triethylsilyl)aminoethylmethyldiethoxysilane, N,N',N'-tris(trimethylsilyl)-N-(2-aminoethyl)-3-aminopropyltriethoxysilane, N,N',N'-tris(trimethylsilyl)-N-

(2-aminoethyl)-3-aminopropylmethyldiethoxysilane, N,N',N'-tris(trimethylsilyl)-N-(2-aminoethyl)-3-aminopropyltrimethoxysilane, N,N',N'-tris(trimethylsilyl)-N-(2-amino -ethyl)-3-aminopropylmethyldimethoxysilane, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane and the like.

Preferred examples thereof include N,N-bis(triethyl -silyl)aminopropylmethyldimethoxysilane, N,N-bis(trimethylsilyl) -aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane and the like.

The conjugated diene polymer having the alkali metal or alkaline-earth metal active end is allowed to react with the hydrocarbyloxysilane compound, whereby a site of the alkali metal or alkaline-earth metal active end and the functional group (I) of the hydrocarbyloxysilane compound react with each other. Thus, the modified conjugated diene polymer having the functional group (II) can be obtained. Further, the hydrocarbyloxysilane compounds are reactable with the conjugated diene polymers having metal active ends composed of alkali metals or alkaline-earth metals. All the compounds have the same action, from the viewpoint that they react or interact with carbon black and/or silica acting as a reinforcing agent in the rubber composition to give excellent low hysteresis loss properties in the cross-linked rubber obtained, and therefore, even one which is not described in Examples described later can be used in the present invention.

A modification reaction for introducing such a hydrocarbyloxysilane compound into the alkali metal or alkaline-earth metal active end of the conjugated diene polymer can be performed, for example, by a solution reaction (an unreacted monomer-containing solution used at the time of polymerization may be used). There is no particular limitation on the type of the modification reaction, and it may be performed using a batch type reactor or continuously performed using an apparatus such as a multistage continuous type reactor or an in-line mixer. Further, it is preferred that this modification reaction is performed before performing various operations necessary for desolventizing treatment, water treatment, heat treatment and polymer isolation after completion of the polymerization reaction.

The amount of the hydrocarbyloxysilane compound used in this modification reaction is preferably 0.1 molar equivalents or more, and more preferably 0.3 molar equivalents or more, based on the active site of the conjugated diene polymer obtained by the anionic polymerization. When the amount is 0.1 molar equivalents or more, the progress of the modification reaction becomes sufficient, and dispersibility of a reinforcing agent is sufficiently improved. Further, the cross-linked rubber composition obtained is excellent in tensile strength, wear resistance, wet skid resistance and low hysteresis loss properties.

In this connection, a method for adding the hydrocarbyloxysilane compound as a modifier is not particularly limited, and examples thereof include a method of batch addition, a method of split addition, a method of continuous addition, and the like. Above all, the method of batch addition is preferred. Further, the hydrocarbyloxysilane compound may be added in the form of a solution wherein the conjugated diene monomer, the aromatic vinyl compound, the hydrocarbon solvent, the randomizer or the like, which is exemplified in this specification, is used as a solvent.

As the temperature of the modification reaction, the polymerization temperature of the conjugated diene compound can be used as it is. The temperature is preferably from 0 to 120° C., and more preferably from 20 to 100° C. When the temperature decreases, the viscosity of the polymer tends to increase, and when the temperature increases, the polymerization active end is liable to be deactivated. Accordingly, the temperature outside the above-mentioned numerical value range is unfavorable. Further, the reaction time in the primary modification reaction is preferably from 1 minute to 5 hours, and more preferably from 2 minutes to 1 hour.

When the conjugated diene polymer is produced, it is also possible to add a coupling agent together with the hydrocarbyloxysilane compound. Examples of the coupling agents are as follows. In this connection, this coupling agent is added at the stage where the conjugated diene polymer is modified with the above-mentioned hydrocarbyloxysilane compound.

Namely, the coupling agents used together with the hydrocarbyloxysilane compound and allowed to react on the polymerization active end include at least one compound selected from the group consisting of (a) isocyanate compounds and/or isothiocyanate compounds, (b) amide compounds and/or imide compounds, (c) pyridyl-substituted ketone compounds and/or pyridyl-substituted vinyl compounds, (d) silicon compounds, (e) ester compounds, (f) ketone compounds, (g) tin compounds, (h) epoxy compounds, (i) phosphoric ester compounds, (j) acid anhydride group-containing compounds, (k) arylvinyl group-containing compounds and (1) halogenated carbon group-containing compounds.

Of these compounds, the isocyanate compounds or the isothiocyanate compounds as the component (a) include 2,4-tolylenediisocyanate, 2,6-tolylenediisocyanate, diphenylmethane diisocyanate, diphenylethane diisocyanate, polymeric-type diphenylmethane diisocyanate (C-MDI), isophorone diisocyanate, hexamethylene diisocyante, 1,3,5-benzenetriisocyanate, phenyl-1,4-diisothiocyanate and the like, as suitable examples.

The amide compounds or the imide compounds as the component (b) include amide compounds such as succinamide, phthalamide, N,N,N',N'-tetramethylphthalamide, oxamide, N,N,N',N'-tetramethyloxamide, adipic acid bisdimethylamide and poly-methacrylic acid dimethylamide, imide compounds such as succinimide, N-methylsuccinimide, maleimide, N-methylmaleimide, phthalimide and N-methylphthalimide, and the like, as suitable examples.

The pyridyl-substituted ketone compounds or the pyridyl-substituted vinyl compounds as the component (c) include dibenzoylpyridine, diacetylpyridine, divinylpyridine and the like, as suitable examples.

The silicon compounds as the component (d) include dibutyldichlorosilicon, methyltrichlorosilicon, methyldichlorosilicon, tetrachlorosilicon (silicon tetrachloride), silicon tetrabromide, silicon tetraiodide, monochlorotrimethoxysilane, monobromotrimethoxysilane, dichlorodimethoxysilane, dibromodimethoxysilane, trichloromethoxysilane, tribromomethoxysilane, hexachlorodisilane, bis(trichlorosilyl) -methane, 1,2-bis(trichlorosilyl)ethane, 1,3-bis(trichlorosilyl)propane, 1,4-bis(trichlorosilyl)

butane, 1,5-bis(trichlorosilyl)pentane, 1,6-bis(trichlorosilyl) hexane, triethoxymethylsilane, triphenoxymethylsilane, trimethoxysilane, methyltriethoxysilane, tetramethoxysilane, tetraethoxysilane, tetrabutoxysilane, 3-acetylpropoxytri-methoxysilane, N-(1,3-dimethylbutylidene)-3-(triethoxysilyl)-1-propaneamine, N-(1,3-dimethylbutylidene)-3-(tributoxysilyl)-1-propaneamine, N-(1-methylpropylidene)-3-(triethoxysilyl)-1-propaneamine, N-ethylidene-3-(triethoxysilyl)-1-propaneamine, N-(3-triethoxysilylpropyl)-4,5-dihydroimidazole, 3-chloropropoxytrimethoxysilane, 4,5-epoxyheptyldimethoxysilane, bis(triethoxysilylpropyl)tetrasulfide and the like, as suitable examples.

The ester compounds as the component (e) include dimethyl adipate, diethyl adipate, dimethyl terephthalate, diethyl terephthalate, dimethyl phthalate, dimethyl isophthalate, diethyl malonate, diethyl phthalate, diethyl glutarate, diethyl maleate and the like, as suitable examples.

The ketone compounds as the component (f) include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, 4,4'-diacetylbenzophenone and the like, as suitable examples.

The tin compounds as the component (g) include tetrachlorotin, tetrabromotin, trichlorobutyltin, trichloromethyltin, trichloroethyltin, trichlorophenyltin, trichloro-octyltin, dibromodimethyltin, dichlorodimethyltin, dichlorodibutyltin, dichlorodioctyltin, 1,2-bis(trichlorostannyl)ethane, 1,2-bis(methyldichlorostannyl)ethane, 1,4-bis(trichloro-stannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate and the like, as suitable examples.

The epoxy compounds as the component (h) include polyglycidyl ethers of polyhydric alcohols, such as ethylene glycol diglycidyl ether and glycerin triglycidyl ether, polyglycidyl ethers of aromatic compounds having two or more phenyl groups, such as diglycidylated bisphenol A, polyepoxy compounds such as 1,4-diglycidylbenzene, 1,3,5-triglycidylbenzene and polyepoxidated liquid polybutadiene, epoxy group-containing tertiary amines such as 4,4'-diglycidyl-diphenylmethylamine and 4,4'-diglycidyldibenzylmethylamine, glycidylamino compounds such as diglycidylaniline, diglycidylorthotoluidine, tetraglycidyl-metaxylenediamine, tetraglycidyl-aminodiphenylmethane, tetraglycidyl-p-phenylenediamine, diglycidylaminomethyl-cyclohexane and tetraglycidyl-1,3-bisaminomethylcyclohexane, epoxy group- and other functional group-containing compounds such as 3-glycidoxy-propyltrimethoxysilane, 3-glycidoxypropyltriethoxysilane, 3-glycidoxypropyltributoxysilane, epoxy-modified silicones, epoxidated soybean oil and epoxidated linseed oil, and the like, as suitable examples.

The phosphoric ester compounds as the component (i) include polyhalogenated phosphorous compounds such as trichlorophosphine and tribromophosphine, phosphite ester compounds such as trisnonylphenyl phosphite, trimethyl phosphite and triethyl phosphite, trimethyl phosphate, triethyl phosphate and the like, as suitable examples.

The acid anhydride group-containing compounds as the component (j) include pyromellitic anhydride, a styrene-maleic anhydride copolymer and the like, as suitable examples.

The arylvinyl group-containing compounds as the component (k) include divinylbenzene, diisopropenylbenzene, a divinylbenzene oligomer and the like, as suitable examples.

The halogenated carbon group-containing compounds as the component (1) include trichloropropane, tribromopropane, tetrachlorobutane and the like, as suitable examples.

These compounds allowed to react on the polymerization active ends together with the hydrocarbyloxysilane compounds may be used either alone or as a combination of two or more thereof The amount of the above-mentioned coupling agent used is 1 mole or less, and preferably from 0.1 to 0.5 moles, in terms of the amount of coupling-capable substituents in the coupling agent, per gram atom equivalent of the alkali metal or alkaline-earth metal constituting the polymerization initiator. When the amount exceeds 1 mole, the reaction rate of the hydrocarbyloxysilane compound is lowered, and the cross-linked rubber composition which is excellent low hysteresis loss properties and the like may sometimes not be obtained.

[Step (b)]

The production method of the present invention further comprises (b) a step of mixing the modified conjugated diene polymer obtained in the step (a) and one or more selected from the group consisting of organic acid compounds and organic acid derivatives to obtain the modified conjugated diene rubber.

The organic acid compounds and organic acid derivatives used in the step (b) include carboxylic acids, carboxylic acid derivatives, organic phosphoric (phosphorous) acids, organic phosphoric (phosphorous) acid derivatives, organic sulfonic acids, organic sulfonic acid derivatives, organic sulfinic acids, organic sulfinic acid derivatives, organic thio acids and the like.

These may be used either alone or as a combination of two or more thereof.

In this connection, in this specification, the organic phosphoric (phosphorous) acids mean organic phosphoric acids or organic phosphorous acids, and the organic phosphoric (phosphorous) acid derivatives mean organic phosphoric acid derivatives or organic phosphorous acid derivatives.

The carboxylic acids include aliphatic carboxylic acids, phenyl group-containing carboxylic acids, heterocycle-containing carboxylic acids and the like.

Specific examples of the aliphatic carboxylic acids include monocarboxylic acids such as formic acid, acetic acid, propionic acid, isobutyric acid, 2-methylbutyric acid, octylic acid, 2-methylpentanoic acid, cyclohexanecarboxylic acid, isononanoic acid, undecylenic acid, oleic acid, lauric acid, myristic acid, palmitic acid, behenic acid, stearic acid, isostearic acid, naphthenic acid, monochloroacetic acid, methoxyacetic acid, 2-chloropropionic acid, 3-chloropropionic acid, α-bromopropionic acid, cyanoacetic acid, acrylic acid, methacrylic acid, vinylacetic acid, crotonic acid, sorbic acid, glyoxylic acid, pyruvic acid, levulinic acid, thioglycolic acid, β-mercaptopropionic acid, 2-hydroxymethylbutyric acid, lactic acid, dimethylolpropionic acid, dimethylolbutanoic acid, gluconic acid, glycine and 2-amino-3-(carboxymethylthio)-propionic acid; dicarboxylic acids such as maleic acid, oxalic acid, malonic acid, succinic acid, glutaric acid, adipic acid, methylsuccinic acid, sebacic acid, dodecanedioic acid, brassylic acid, fumaric acid, itaconic acid, citraconic acid, dibenzoyltartaric acid, dimer acid, 3,3'-dithiodipropionic acid, 3,3'-thiodipropionic acid, thiomalic acid, tartaric acid, malic acid, iminodiacetic acid, 2-aminoadipic acid, glutamic acid, aspartic acid and cystine; trivalent or more polycarboxylic acids such as citric acid, 1,2-cyclohexanediaminetetraacetic acid and ethylenediaminetetraacetic acid; aliphatic amino acids such as isoleucine, alanine, β-alanine, threonine, serine and isoserine; and the like.

The phenyl group-containing carboxylic acids include an aromatic carboxylic acid in which a carboxyl group is directly bonded to a phenyl group, a carboxylic acid in which a carboxyl group is bonded to a phenyl group through a carbon chain, and the like.

Specific examples of the aromatic carboxylic acids in which a carboxyl group is directly bonded to a phenyl group include aromatic monocarboxylic acids such as benzoic acid, o-toluic acid, m-toluic acid, p-toluic acid, p-t-butylbenzoic acid, o-chlorobenzoic acid, 2,4-dichlorobenzoic acid, 4-chloro-3-nitrobenzoic acid, α-naphthoic acid, o-benzoylbenzoic acid, β-oxynaphthoic acid, 1,4-dihydroxy-2-naphthoic acid, 1,4-dihydroxy-2-naphthoic acid, o-nitrobenzoic acid, m-nitrobenzoic acid, p-nitrobenzoic acid, o-hydroxybenzoic acid, m-hydroxybenzoic acid, p-hydroxybenzoic acid, salicylic acid, thiosalicylic acid, 6-hydroxy-2-naphthoic acid, 4-hydroxybiphenyl-4'-carboxylic acid, o-aminobenzoic acid, m-aminobenzoic acid and p-aminobenzoic acid; aromatic dicarboxylic acids such as isophthalic acid, terephthalic acid, 1,4-naphthalenedicarboxylic acid, 2,6-naphthalenedicarboxylic acid and 5-hydroxyisophthalic acid; trivalent or more aromatic polycarboxylic acids such as trimellitic acid, trimesic acid, trimellitic anhydride, pyromellitic acid and pyromellitic anhydride; aromatic amino acids such as tyrosine and tryptophan; and the like.

Specific examples of the carboxylic acids in which a carboxyl group is bonded to a phenyl group through a carbon chain include phenylacetic acid, p-methoxyphenylacetic acid, 2-chlorophenylacetic acid, 4-chlorophenylacetic acid, phenoxyacetic acid, α-phenoxypropionic acid, cinnamic acid, ferulic acid, 3-chloromandelic acid, 2-chloromandelic acid, mandelic acid, benzilic acid, p-hydroxyphenylacetic acid, p-hydroxyphenylacetic acid, p-hydroxyphenylpropionic acid and the like.

Specific examples of the heterocycle-containing carboxylic acids include tetrahydro-5-oxo-2-furancarboxylic acid, 3-carbamoyl-pyrazinecarboxylic acid, picolinic acid, nicotinic acid, isonicotinic acid, 2-chloronicotinic acid, quinaldinic acid, citrazinic acid, pyrazinemonocarboxylic acid, chelidamic acid and the like.

The carboxylic acid derivatives include carboxylic anhydrides, halogenated materials of carboxylic acids, carboxylic esters and the like.

The carboxylic anhydrides include anhydrides of the above-mentioned carboxylic acids such as isobutyric anhydride, itaconic anhydride, succinic anhydride, acetic anhydride, citraconic anhydride, propionic anhydride, maleic anhydride, butyric anhydride and phthalic anhydride.

The halogenated materials of carboxylic acids include halogenated materials of the above-mentioned carboxylic acids such as halogenated acetyl, halogenated propionyl, halogenated butyryl, halogenated benzoyl and cyclohexane halide. The term halogenated as used herein means fluorinated, chlorinated, brominated or iodinated, and the term halide means fluoride, chloride, bromide or iodide (hereinafter the same).

The carboxylic esters include ester bodies of the above-mentioned carboxylic acids such as methyl acetate, ethyl acetate, methyl propionate, methyl propionate, methyl methacrylate, dimethyl maleate and methyl benzoate.

The organic phosphoric (phosphorous) acids include compounds represented by the following formula (1):

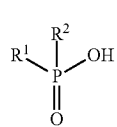

(1)

(In the above-mentioned formula (1), $R^1$ is a monovalent hydrocarbon group having 0.1 to 30 carbon atoms or a group represented by $-OR^3$. $R^2$ is a hydrogen atom, a hydroxy group, a monovalent hydrocarbon group having 1 to 30 carbon atoms or a group represented by $-OR^3$ wherein $R^3$ is a monovalent hydrocarbon group having 1 to 30 carbon atoms.)

Specific examples thereof include compounds such as methylphosphonic acid, ethylphosphonic acid, phenylphosphonic acid, dimethylphosphonic acid, diethylphosphonic acid, diphenylphosphonic acid, methylphenylphosphonic acid, methylphosphinic acid and phenylphosphinic acid.

The organic phosphoric (phosphorous) acid derivatives include organic phosphoric (phosphorous) acid halides, organic phosphoric (phosphorous) acid esters and the like.

The organic phosphoric (phosphorous) acid halides include compounds represented by the following formula (2):

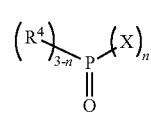

(2)

(In the above-mentioned formula (2), $R^4$ is a monovalent hydrocarbon group having 1 to 30 carbon atoms, X is a halogen atom, and n is an integer of 1 or 2. When a plurality of $R^4$s are present, they may be the same or different.)

Specific examples thereof include halogen compounds of organic phosphoric (phosphorous) acids, such as dimethylphosphinic acid halide, diethylphosphinic acid halide, diphenylphosphinic acid halide, ethylmethylphosphinic acid halide, methylphosphonic acid dihalide and phenylphosphonic acid dihalide.

The organic phosphoric (phosphorous) acid esters include compounds represented by the following formula (3):

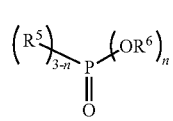

(3)

(In the above-mentioned formula (3), $R^5$ is a monovalent hydrocarbon group having 1 to 30 carbon atoms, and $R^6$ is a monovalent hydrocarbon group having 1 to 30 carbon atoms. When a plurality of $R^5$s are present, they may be the same or different. When a plurality of $R^6$s are present, they may be the same or different. Further, $R^5$ and $R^6$ may be the same or different. n is an integer of 1 to 3.)

Specific examples thereof include ester bodies of the organic phosphoric (phosphorous) acids, such as methyl dimethylphosphinate, ethyl diphenylphosphinate, diethyl phenylphosphonate, dimethyl methylphosphonate, diphenyl phenylphosphonate, trimethyl phosphate, triphenyl phosphate, methyldiphenyl phosphate and ethylmethylphenyl phosphate.

The organic sulfonic acids include compounds represented by the following formula (4):

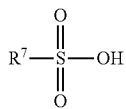

(4)

(In the above-mentioned formula (4), $R^7$ is a monovalent hydrocarbon group having 1 to 30 carbon atoms, or a hydroxy group. Further, a hydrogen atom of $R^7$ may be substituted with a halogen atom.)

Specific examples thereof include methanesulfonic acid, ethanesulfonic acid, trifluoromethanesulfonic acid, p-toluenesulfonic acid and the like.

The organic sulfonic acid derivatives include organic sulfonic acid halides, organic sulfonic acid esters and the like.

The organic sulfonic acid halides include compounds represented by the following formula (5):

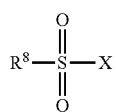

(5)

(In the above-mentioned formula (5), $R^8$ is a monovalent hydrocarbon group having 1 to 30 carbon atoms. X is a halogen atom. Further, a hydrogen atom of $R^8$ may be substituted with a halogen atom.)

Specific examples thereof include halides of the above-mentioned organic sulfonic acids, such as methanesulfonyl halide, ethanesulfonyl halide, trifluoromethanesulfonyl halide and p-toluenesulfonyl halide.

The organic sulfonic acid esters include compounds represented by the following formula (6):

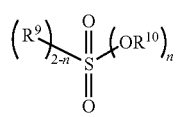

(6)

(In the above-mentioned formula (6), $R^9$ is a monovalent hydrocarbon group having 1 to 30 carbon atoms, and $R^{10}$ is a monovalent hydrocarbon group having 1 to 30 carbon atoms. When a plurality of $R^{10}$s are present, they may be the same or different. Further, $R^9$ and $R^{19}$ may be the same or different. n is an integer of 1 or 2.)

Specific examples thereof include methyl methanesulfonate, ethyl benzenesulfonate, isopropyl p-toluenesulfonate, dimethyl sulfonate, methylphenyl sulfonate, diphenyl sulfonate and the like.

The organic sulfinic acids include compounds represented by the following formula (7):

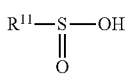

(7)

(In the above-mentioned formula (7), $R^H$ is a monovalent hydrocarbon group having 1 to 30 carbon atoms, or a hydroxy group. Further, a hydrogen atom of $R^{11}$ may be substituted with a halogen atom.)

Specific examples thereof include sulfinic acid compounds such as methanesulfinic acid, ethanesulfinic acid, p-toluenesulfinic acid and trifluoromethanesulfinic acid.

The organic sulfinic acid derivatives include organic sulfinic acid halides, organic sulfinic acid esters and the like.

The organic sulfinic acid halides include compounds represented by the following formula (8):

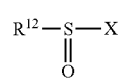

(8)

(In the above formula (8), $R^{12}$ is a monovalent hydrocarbon group having 1 to 30 carbon atoms. X is a halogen atom. Further, a hydrogen atom of $R^{12}$ may be substituted with a halogen atom.)

Specific examples thereof include halides of the above-mentioned organic sulfinic acids, such as methanesulfinyl halide, ethanesulfinyl halide, p-toluenesulfinyl halide and trifluoromethanesulfinyl halide.

The organic sulfinic acid esters include compounds represented by the following formula (9):

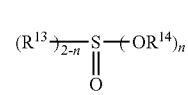

(9)

(In the above formula (9), $R^{13}$ is a monovalent hydrocarbon group having 1 to 30 carbon atoms, and $R^{14}$ is a monovalent hydrocarbon group having 1 to 30 carbon atoms. When a plurality of $R^{14}$s are present, they may be the same or different. Further, $R^{13}$ and $R^{14}$ may be the same or different. n is an integer of 1 or 2.)

Specific examples thereof include ester bodies of the above-mentioned sulfinic acids, such as methyl benzenesulfinate, diphenyl sulfinate and ethyl methanesulfinate.

The organic thio acids include compounds represented by the following formula (10):

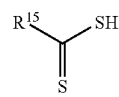

(10)

(In the above formula (10), $R^{15}$ is a monovalent hydrocarbon group having 1 to 30 carbon atoms.)

Specific examples thereof include dithioacetic acid and the like.

All these organic acid compounds or organic acid derivatives have the same action, from the viewpoint that it is possible to convert the functional group (II) into an onium, and therefore, even one not described in Examples described later can be used in the present invention.

Mixing of the modified conjugated diene polymer obtained in the step (a) and one or more selected from the group consisting of organic acid compounds and organic acid derivatives can be performed, for example, in the form of a solution. There is no particular limitation on the type of mixing, and it may be performed using a batch type mixer or continuously performed using an apparatus such as a multistage continuous type mixer or an in-line mixer.

The amount of the organic acid compound and/or the organic acid derivative used is preferably 1.0 molar equivalent or more, and more preferably 1.5 molar equivalents or more, based on alkali components present in a reaction system. When it is less than 1.0 molar equivalent, the conversion into the onium does not sufficiently progress, which sometimes results in inferior rubber shape-retaining properties.

A method for adding the organic acid compound and/or the organic acid derivative is not particularly limited, and examples thereof include a method of batch addition, a method of split addition, a method of continuous addition, or the like. Above all, the method of batch addition is preferred. Further, the organic acid compound and/or the organic acid derivative may be added in the form of a solution wherein the hydrocarbon solvent, the randomizer or the like, which is exemplified in this specification, is used as a solvent.

As the temperature at the time of mixing the modified conjugated diene polymer obtained in the step (a) and one or more selected from the group consisting of organic acid compounds and organic acid derivatives, the polymerization temperature of the conjugated diene polymer can be used as it is. The temperature is preferably from 0 to 120° C., and more preferably from 20 to 100° C. When the temperature decreases, the viscosity of the polymer tends to increase, and when the temperature increases, the polymerization active end is liable to be deteriorated. Accordingly, the temperature outside the above-mentioned numerical value range is unfavorable. Further, the mixing time is preferably from 1 minute to 5 hours, and more preferably from 2 minutes to 1 hour.

In this connection, in the method for producing a modified conjugated diene rubber of the present invention, after one or more selected from the group consisting of organic acid compounds and organic acid derivatives are added, the modified conjugated diene rubber can be collected by operations of desolventizing (for example, steam stripping or the like) and drying, which are known in the production of conjugated diene polymers.

Further, when the hydrocarbyloxysilane compound has two or more hydrocarbyloxysilyl groups, it is also possible to mix the modified conjugated diene polymer obtained in the prior step and a metal element-containing catalyst (hereinafter sometimes simply referred to as a "condensation catalyst") for condensing the hydrocarbyloxysilane compound, in the step (b), for the purpose of improving reactivity with a filler.

As the above-mentioned condensation catalyst, a metal compound containing at least one metal element of metal elements included in group 4, group 12, group 13, group 14 and group 15 in the periodic table is preferable. As the above-mentioned metal elements, titanium, zirconium, aluminum, bismuth, tin and the like are preferable.

Further, the above-mentioned condensation catalyst is preferably a hydrocarbyloxide, a carboxylate or an acetylacetonato complex salt of the above-mentioned metal.

The condensation catalyst promotes the condensation of the modified conjugated diene polymer, and the condensation catalyst itself also reacts with a hydrocarbyloxy residue of the modified conjugated diene polymer, by which the reactivity with the filler is further enhanced.

Examples of the above-mentioned condensation catalysts include tetramethoxytitanium, tetraethoxytitanium, tetra-n-propoxytitanium tetra-i-propoxytitanium, tetra-n-butoxytitanium, tetra-n-butoxytitanium oligomer, tetra-sec-butoxytitanium, tetra-tert-butoxytitanium, tetra(2-ethylhexyloxy)titanium, bis(octanediolato)bis(2-ethylhexyloxy)titanium, tetra(octanediolato)titanium, titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatobis(ethylacetoacetate), titanium tributoxyacetylacetonate, titanium dibutoxybis(acetylacetonate), titanium tributoxyethylacetoacetate, titanium butoxyacetylacetonatobis(ethylacetoacetate), titanium tetrakis(acetylacetonate) and titanium diacetylacetonatobis(ethylacetoacetate).

Further, examples thereof include bis(2-ethylhexanoato) titanium oxide, bis(laurato)titanium oxide, bis(naphthato) titanium oxide, bis(stearato)titanium oxide, bis-(oleato)titanium oxide, bis(linolato)titanium oxide, tetrakis(2-ethylhexanoato)titanium, tetrakis(laurato)titanium, tetrakis(naphthato)titanium, tetrakis(stearato)titanium, tetrakis(oleato)titanium, tetrakis(linolato)titanium, tris(2-ethylhexanoato)bismuth, tris-(laurato)bismuth, tris(naphthato)bismuth, tris(stearato)bismuth, tris(oleato)bismuth and tris(linolato)bismuth.

Furthermore, examples thereof include tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonato-bis (ethylacetoacetate), zirconium tetrakis(acetylacetonate), zirconium diacetylacetonatobis(ethylacetoacetate), bis(2-ethylhexanoato)zirconium oxide, bis(laurato)zirconium oxide, bis(naphthato)zirconium oxide, bis(stearato)zirconium oxide, bis(oleato)zirconium oxide, bis(linolato)zirconium oxide, tetrakis(2-ethylhexanoato)zirconium, tetrakis(laurato)zirconium, tetrakis(naphthato)zirconium, tetrakis(stearato)zirconium, tetrakis(oleato)zirconium and tetrakis(linolato)zirconium.

Moreover, examples thereof include triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetate, aluminum butoxybis(acetylacetonate), aluminum dibutoxyethylacetoacetate, aluminum tris(acetylacetonate), aluminum tris (ethylacetoacetate), tris(2-ethylhexanoato)aluminum, tris (laurato)aluminum, tris(naphthato)aluminum, tris(stearato) aluminum, tris(oleato)aluminum, tris(linolato)aluminum, bis(n-octanoato)tin, bis(2-ethylhexanoato)tin, tin dilaurate, tin dinaphthoenate, tin distearate, tin dioleate, dibutyltin diacetate, dibutyltin bis(n-octanoate), dibutyltin bis(2-ethylhexanoate), dibutyltin dilaurate, dibutyltin malate, dibutyltin bis(benzylmalate), dibutyltin bis(2-ethylhexylmalate), di-n-octyltin diacetate, di-n-octyltin bis(n-octanoate), di-n-octyltin bis(2-ethylhexanoate), di-n-octyltin dilaurate, di-n-octyltin malate, di-n-octyltin bis(benzylmalate), di-n-octyltin bis (2-ethylhexylmalate) and the like.

Of these condensation catalysts, tetrakis(2-ethylhexanoato)titanium, tetra(octanediolato)titanium, tris(2-ethylhexanoato)bismuth, tetra-n-propoxyzirconium, tetra-n-butoxyzirconium, bis(2-ethylhexanoato)zirconium oxide, bis (oleato)zirconium oxide, tri-i-propoxyaluminum, tri-sec-butoxyaluminum, tris(2-ethylhexanoato)aluminum, tris (stearato)aluminum, zirconium tetrakis(acetylacetonate), aluminum tris(acetylacetonate), bis(2-ethylhexanoato)tin and di-n-octyltin bis(2-ethylhexylmalate) are preferable.

The amount of the catalyst used in this mixing, which contains the metal element for condensing the hydrocarbyloxysilane, is preferably from 0.1 to 10 molar equivalents, and more preferably from 0.2 to 5 molar equivalents, based on the hydrocarbyloxysilyl group present in the reaction system. When the amount is less than 0.1 molar equivalents, the progress of the condensation reaction is sometimes insufficient. On the other hand, even when the amount used exceeds 10 molar equivalents, the effect of the condensation catalyst to react is saturated, which is economically unfavorable.

In this connection, a method for adding the condensation catalyst as the modifier is not particularly limited, and examples thereof include a method of batch addition, a method of split addition, a method of continuous addition, or the like. Above all, the method of batch addition is preferred. Further, the condensation catalyst may be added in the form of a solution using as a solvent the hydrocarbon solvent, the randomizer or the like, which is exemplified in this specification.

The temperature at the time of mixing the condensation catalyst and another component (for example, the modified conjugated diene polymer obtained in the step (a)) is preferably from 0 to 120° C., and more preferably from 20 to 100° C. When the temperature decreases, the viscosity of the polymer tends to increase, and when the temperature increases, the polymerization active end is liable to be deteriorated. Accordingly, the temperature within the above-mentioned numerical value range is preferred.

Further, the mixing time is preferably from 1 minute to 5 hours, and more preferably from 2 minutes to 1 hour. When the mixing time is less than 1 minute, the mixing is sometimes not completed. On the other hand, when the mixing time exceeds 5 hours, the mixing is saturated, resulting in a waste of the mixing time.

[Step (c)]

Further, the production method of the present invention can further comprise (c) a step of bringing the modified conjugated diene rubber obtained in the step (b) into contact with water. The modified conjugated diene polymer contained in the modified conjugated diene rubber forms an onium structure by bringing the organic acid compound or the organic acid derivative into contact with water, by which a modified conjugated diene rubber having the onium structure can be obtained.

There is no particular limitation on a method of bringing the organic acid compound or the organic acid derivative into contact with water. For example, preferred are (i) a method of directly adding water into the polymer solution after the step (b), followed by mixing, (ii) a method of adding one obtained by dissolving water in an organic solvent soluble in both water and an organic solvent, such as an alcohol, into the polymer solution after the step (b), followed by mixing, and (iii) a method of mixing the polymer solution and/or the polymer and water at the same time of desolventizing in a step of steam stripping after the step (b). Above all, the method (iii) of mixing the polymer solution and/or the polymer and water at the same time of desolventizing in a step of steam stripping after the step (b) is particularly preferred from the viewpoint of efficient formation of the onium structure.

Further, the temperature at the time of the reaction is preferably from 30 to 150° C., and more preferably from 80 to 120° C.

As the modified conjugated diene rubber used in this step, the polymer solution obtained at the time of preparing the modified conjugated diene rubber may be used as it is without desolventizing, or the modified conjugated diene polymer obtained by desolventizing the polymer solution by steam stripping or the like, followed by further drying may be dissolved again in a solvent such as cyclohexane and used.

[Modified Conjugated Diene Rubber]

The modified conjugated diene rubber of the present invention is a modified conjugated diene rubber obtained by the method for producing a modified conjugated diene rubber, which has hitherto been described. Such a modified conjugated diene rubber is high in Mooney viscosity, excellent in shape stability and good in workability. The Mooney viscosity (ML1+4, 100° C.) of the modified conjugated diene rubber of the present invention is preferably from 30 to 150 and more preferably from 40 to 120. When the Mooney viscosity is less than 30, the shape stability tends to decrease. On the other hand, when the Mooney viscosity exceeds 150, workability is deteriorated, sometimes resulting in a difficulty in kneading together with compounding agents.

Incidentally, when the Mooney viscosity is too high, it is adjusted within this range usually by oil extension with an extender oil.

As the extender oil, preferred is aroma oil, naphthene oil, paraffin oil or aroma-alternative oil of PCA of 3% by mass or less by a method of IP 346. The amount of the extender oil used is usually from 10 to 50 parts by mass based on 100 parts by mass of the modified conjugated diene rubber, although it is arbitrary. When the extender oil is used, it is generally used in a blending amount of 20 to 37.5 parts by mass in many cases. In the classification according to the oil production process, there can be suitably used T-DAE (Treated Distillate Aromatic Extract) oil, T-RAE (Treated Residual Aromatic Extract) oil, MES (Mild Extract Solvate) oil, RAE (Residual Aromatic Extract) oil and the like.

[Rubber Composition]

The rubber composition of the present invention contains the above-mentioned modified conjugated diene rubber as a rubber component. Details thereof will be described below.

[Rubber Component]

The rubber component in the rubber composition of the present invention contains the above-mentioned modified conjugated diene rubber. The contained ratio of the modified conjugated diene rubber in the rubber component is preferably 20% by mass or more, more preferably 30% by mass or more, and particularly preferably 40% by mass or more. When the contained ratio is adjusted to 20% by mass or more, mechanical properties such as tensile strength and tensile elongation, crack growth resistance and wear resistance of the cross-linked rubber composition can be more improved.

Further, in the modified conjugated diene rubber constituting the rubber composition of the present invention, either one kind of modified conjugated diene rubber or two or more kinds of modified conjugated diene rubbers may be contained. Furthermore, in addition to the modified conjugated diene rubber, another rubber component may be contained. Examples of the other rubber components include natural rubber, synthetic isoprene rubber, butadiene rubber, modified butadiene rubber, styrene-butadiene rubber, modified styrene-butadiene rubber, ethylene-α-olefin copolymerized rubber, ethylene-α-olefin-diene copolymerized rubber, acrylonitrile-butadiene copolymerized rubber, chloroprene rubber, halogenated butyl rubber, styrene-isoprene copolymerized rubber, butadiene-isoprene copolymerized rubber, random styrene-butadiene-isoprene copolymerized rubber, styrene-acrylonitrile-butadiene copolymerized rubber, acrylonitrile-butadiene copolymerized rubber and polystyrene-polybutadiene-polystyrene block copolymer, and mixtures thereof and the like. Even when the other known rubber component usable in a rubber composition for tire use is contained, it is possible to produce the cross-linked rubber excellent in low hysteresis loss properties.

[Other Components (Carbon Black, Silica)]

It is preferred that the rubber composition of the present invention further contains carbon black and/or silica. Specific examples of the carbon blacks include furnace black represented by SRF, GPF, FEF, HAF, ISAF, SAF, ISAF-HS, ISAF-LS, IISAF-HS, HAF-HS and HAF-LS, acetylene black, thermal black, channel black and graphite, and further include graphite fiber, fullerene and the like. Further, it is preferred that the carbon black has an iodine adsorption amount (IA) of 60 mg/g or more and a dibutyl phthalate oil absorption (DBP) of 80 ml/100 g or more. Effects of improving grip performance and fracture resistance characteristics of the cross-linked rubber composition are increased by using the carbon black. Incidentally, HAF, ISAF and SAF excellent in wear resistance are particularly preferred. The carbon blacks may be used either alone or as a combination of two or more thereof.

Examples of the silicas include wet silica (hydrated silicic acid), dry silica (silicic acid anhydride), colloidal silica, precipitated silica, calcium silicate, aluminum silicate and the like. Of these, wet silica is preferred, because an effect of improving fracture resistance characteristics and an effect of achieving a balance between wet grip properties and low hysteresis loss properties are most remarkable. Further, the use of high dispersible type silica improves dispersibility thereof in the rubber, and is preferred in terms of physical properties and workability. The silicas may be used either alone or as a combination of two or more thereof The amount of the carbon black and/or the silica in the rubber composition of the present invention is preferably from 20 to 130 parts by mass, and more preferably from 25 to 110 parts by mass from the viewpoint of reinforcing properties and an effect of improving various physical properties thereby, based on 100 parts by mass of the rubber components (the total of the modified conjugated diene polymer and the other rubber components). In this connection, when the contained ratio of the carbon black and/or the silica is small, the effect of improving fracture resistance characteristics tends to become insufficient, and when the contained ratio of the carbon black and/or the silica is large, workability of the rubber composition tends to be deteriorated. It is therefore preferred that the contained ratio is within the above-mentioned numerical value range. Further, by incorporating a carbon-silica dual phase filler into the rubber composition of the present invention, there can be obtained an excellent advantage similar to that in the case where carbon black and silica are used in combination. The carbon-silica dual phase filler is a so-called silica coating carbon black in which silica is chemically bonded to a surface of carbon black, and is marketed by Cabot Corporation under the trade names of CRX2000, CRX 2002 and CRX 2006. The amount of the carbon-silica dual phase filler incorporated is preferably from 1 to 100 parts by mass, and more preferably from 5 to 95 parts by mass, based on 100 parts by mass of the total of the rubber components.

When the silica is allowed to be contained as a reinforcing agent in the rubber composition of the present invention, it is preferred to incorporate a silane coupling agent in order to further improve a reinforcing effect. The silane coupling agents include, for example, bis(3-triethoxysilylpropyl)tetrasulfide, bis(3-triethoxysilylpropyl)trisulfide, bis(3-triethoxysilylpropyl) disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxy-silane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropyl-methacrylate monosulfide, bis(3-diethoxymethylsilylpropyl)tetrasulfide, 3-mercapto -propyldimethoxymethylsilane, dimethoxymethylsilylpropyl-N,N-dimethylthiocarbamoyl tetrasulfide, dimethoxymethylsilylpropylbenzothiazolyl tetrasulfide, vinyltriethoxysilane, β-(3,4-epoxycyclohexyl)ethyltrimethoxysilane, N-(β-aminoethyl)-γ-aminopropyltrimethoxysilane, 3-octathio-1-propyl-triethoxysilane, γ-trimethoxysilylpropyldimethyl -thiocarbamyl tetrasulfide, γ-trimethoxysilylpropylbenzothiazyl tetrasulfide, the mercaptosilane compounds exemplified in JP-A-2006-249069, and the like. Commercially available products include, for example, "NXT Silane", "NXT-Low-V Silane" and "NXT Ultra Low-V Silane" (trade names) manufactured by Momentive Performance Materials Inc., "VP Si363" (trade name) manufactured by Degussa AG, "11-MERCAPTOUNDECYLTRIMETHOXYSILANE" (trade name) manufactured by Gelest, Inc., and the like. Of these, bis(3-triethoxysilylpropyl)polysulfide, 3-trimethoxysilylpropylbenzothiazyl tetrasulfide and the mercaptosilane compounds exemplified in JP-A-2006-249069 are preferred in terms of an effect of improving reinforcing properties, and the like. In this connection, these coupling agents may be used either alone or as a combination of two or more thereof. The amount of the silane coupling agent incorporated is preferably from 1 to 20 parts by mass, and more preferably from 3 to 15 parts by mass, based on 100 parts by mass of silica, although it varies depending on the kind of silane coupling agent and the like. When the amount is less than 1 part by mass, the effect as the silane coupling agent tends to become less likely to be sufficiently exhibited. On the other hand, when the amount exceeds 20 parts by mass, the rubber components tend to easily gelate.

The various compounding agents of the rubber composition of the present invention are not particularly limited, and a compatibilizing agent can be added at the time of kneading for the purpose of improving workability in kneading or further improving a balance among wet skid resistance, low hysteresis loss properties and wear resistance. Preferred examples of the compatibilizing agents include organic compounds selected from epoxy group-containing compounds, carboxylic acid compounds, carboxylic acid ester compounds, ketone compounds, ether compounds, aldehyde compounds, hydroxyl group-containing compounds and amino group-containing compounds, and silicone compounds selected from alkoxysilane compounds, siloxane compounds and aminosilane compounds.

Examples of the organic compounds as the compatibilizing agents include epoxy group-containing compounds, carboxylic acid compounds, carboxylic acid ester compounds, ketone compounds, ether compounds, aldehyde compounds, amino group-containing compounds, hydroxyl group-containing compounds and the like.

Examples of these various organic compounds include the following compounds.

The epoxy group-containing compounds include butyl glycidyl ether, diglycidyl ether, propylene oxide, neopentyl glycol diglycidyl ether, epoxy resins, epoxidated soybean oil, epoxidated fatty acid esters and the like.

The carboxylic acid compounds include adipic acid, octylic acid, methacrylic acid and the like.

The carboxylic acid ester compounds include acrylic acid esters, diethylene acrylate, ethyl methacrylate, orthoacetic acid esters, ethyl acetoacetate, butyl acetate, isopropyl acetate, dimethyl carbonate, p-hydroxyphenyl acetate, polyester-based plasticizers, stearic acid-based plasticizers and the like.

The ketone compounds include methylcyclohexanone, acetyl acetone and the like.

The ether compounds include isopropyl ether, dibutyl ether and the like.

The aldehyde compounds include undecylenealdehyde, decylaldehyde, vanillin, 3,4-dimethoxybenzaldehyde, cuminaldehyde and the like.

The amino group-containing compounds include isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, n-butylamine hydrochloride and the like.

The hydroxyl group-containing compounds include isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol and the like.

Above all, preferred are epoxy group-containing compounds, amino group-containing compounds and hydroxyl group-containing compounds.

Examples of the silicone compounds as the compatibilizing agents include alkoxysilane compounds, siloxane compounds, aminosilane compounds and the like.

Examples of these various silicone compounds include the following compounds.

The alkoxysilane compounds include trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane and the like.

The siloxane compounds include dimethylsiloxane oligomers, silicone oil, amino-modified silicone oil, epoxy-modified silicone oil, carboxyl-modified silicone oil, polyether-modified silicone oil, alkyl-modified silicone oil, higher fatty acid ester-modified silicone oil, higher alkoxy-modified silicone oil, higher fatty acid-containing silicone oil and the like.

The aminosilane compounds include hexamethyldisilazane, nonamethyltrisilazane, anilitrimethylsilane, bis(dimethylamino)dimethylsilane, bis(diethylamino)dimethylsilane, triethylaminosilane and the like.

Above all, preferred are silazane compounds and bis(dimethylamino)dimethylsilane.

Various chemicals, additives and the like that are commonly used in the rubber industry can be blended in the rubber composition of the present invention, as desired, to the extent that the object of the present invention is not impaired. The chemicals, additives and the like that are blendable in the rubber composition of the present invention include, for example, cross-linking agents, vulcanizing aids, processing aids, vulcanizing accelerators, process oil, anti-aging agents, anti-scorching agents, zinc oxide, stearic acid and the like.

The cross-linking agents include sulfur, organic oxide cross-linking agents, quinoid cross-linking agents, resin cross-linking agents and the like, and more specifically, include vulcanizing agents (sulfur, sulfur halides), organic peroxides, quinone dioximes, organic polyvalent amine compounds, methylol group-containing alkylphenol resins and the like. However, sulfur is usually used. The amount of the cross-linking agent used is preferably from 0.1 to 5 parts by mass, and more preferably from 0.5 to 3 parts by mass, based on 100 parts by mass of the rubber components.

As the vulcanizing aid and the processing aid, stearic acid is generally used. The amount of the vulcanizing aid and the processing aid used is usually from 0.5 to 5 parts by mass based on 100 parts by mass of the rubber components.

Examples of the vulcanizing accelerators include, although not particularly limited, sulfonamide-based, guanidine-based, thiuram-based, thiourea-based, thiazole-based, dithiocarbamic acid-based and xanthogenic acid-based compounds, and preferably include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenyl guanidine, diorthotolylguanidine, orthotolylbiguanidine and the like. The amount of the vulcanizing accelerator used is usually from 0.1 to 5 parts by mass, and preferably from 0.4 to 4 parts by mass, based on 100 parts by mass of the rubber components.

The rubber composition of the present invention can be produced by kneading using a kneader such as an open type kneader including a roll, or a closed type kneader including a Banbury mixer. Further, it can be applied to various rubber products by performing cross-linking (vulcanization) after a molding process. The cross-linked rubber composition (cross-linked material of the rubber composition) of the present invention is suitable for use in tires (for example, a tire tread, an under tread, a carcass, a side wall and parts such as a bead portion), rubber cushions, fenders, belts, hoses, other industrial products and the like. In particular, the cross-linked rubber composition of the present invention is suitably used as a rubber for tire tread use.

In the present invention, physical properties of each of the conjugated diene polymer before modification, the modified conjugated diene rubber and the rubber composition are as follows.

The weight average molecular weight in terms of polystyrene according to gel permeation chromatography (GPC) of the conjugated diene polymer before modification is preferably from 10,000 to 1,500,000, more preferably from 50,000 to 1,000,000, and particularly preferably from 100,000 to 800,000, from the viewpoint of maintaining a balance between shape stability of the modified conjugated diene rubber and workability in producing the rubber composition.

The glass transition temperature of the modified conjugated diene rubber is preferably 0° C. or less, more preferably −5° C. or less, and particularly preferably −10° C. or less, from the viewpoint of maintaining a balance between low hysteresis loss properties and wet skid resistance of the cross-linked rubber obtained.

The Mooney viscosity (ML1+4, 100° C.) of the modified conjugated diene rubber is preferably from 30 to 150, and more preferably from 40 to 120, from the viewpoint of maintaining a balance between shape stability of the modified conjugated diene rubber and workability in producing the rubber composition.

The cold flow value (mg/min) of the modified conjugated diene rubber is preferable 1.5 or less, more preferably 1.0 or less and especially preferably 0.5 or less, from the viewpoint of shape stability of the modified conjugated diene rubber.

The Mooney viscosity (ML1+4, 100° C.) of the rubber composition is preferably from 20 to 150; more preferably from 30 to 130; and particularly preferably from 40 to 110, from the viewpoint of workability in preparing the tire.

EXAMPLES

Although the present invention will be specifically described below on the basis of examples, the present invention is not construed as being limited to these examples. In this connection, "parts" and "percentages" in examples and comparative examples are by mass basis unless otherwise specified. Further, measuring methods of various physical property values are shown below.

[Styrene Unit Amount (%)]: Determined by $^1$H-NMR of 500 MHz.
[Vinyl Content (%)]: Determined by $^1$H-NMR of 500 MHz.
[Polymerization Average Molecular Weight before Modification]: Determined in terms of polystyrene from the retention time corresponding to the maximum peak height of a GPC curve obtained using gel permeation chromatography (GPC), (HLC-8120GPC (trade name)(manufactured by Tosoh Corporation)).
(GPC Conditions)
  Column: Trade name "GMHHXL" (manufactured by Tosoh Corporation), 2 columns
  Column temperature: 40° C.
  Mobile phase: Tetrahydrofuran
  Flow rate: 1.0 ml/min
  Sample concentration: 10 mg/20 ml
[Mooney Viscosity (ML1+4, 100° C.)]: Determined in accordance with JIS K6300-1 using an L-rotor under conditions of preheating for 1 minute, rotor operation for 4 minutes and a temperature of 100° C.
[Cold Flow Value (mg/min)]: A copolymer was kept at a temperature of 50° C. and extruded from a 6.35-mm orifice under conditions of a pressure of 24.1 kPa. After 10 minutes from the time when extruded (after the extrusion speed became constant), the amount (mg) of the copolymer extruded was measured every 30 minutes for 90 minutes, and the average value thereof was defined as the cold flow value. The larger value shows the poorer shape stability of the rubber to become difficult in handling.
[Temporal Stability (ΔML1+4, 100° C.)]: A copolymer was kept in a state of a temperature of 85° C. and a humidity of 90% for 2 days, and thereafter, the Mooney viscosity (ML1+4, 100° C.) thereof was measured in accordance with JIS K6300-1 using an L-rotor under conditions of preheating for 1 minute, rotor operation time for 4 minutes and a temperature of 100° C. The temporal stability was determined from the difference from the Mooney viscosity (ML1+4, 100° C.) just after the production. The larger difference between numerical values shows the poorer storage stability of the rubber to become difficult in handling.

Example 1

Synthesis of Modified Conjugated Diene Rubber A and Evaluation Thereof

An autoclave reactor having an internal volume of 5 liters in which the atmosphere was replaced with nitrogen was charged with 2,500 g of cyclohexane, 25 g of tetrahydrofuran, 100 g of styrene and 390 g of 1,3-butadiene. After adjusting the temperature of contents in the reactor to 10° C., 335 mg of n-butyl lithium was added thereto to initiate polymerization. The polymerization was conducted under adiabatic conditions, and the maximum temperature reached 85° C. At the time when the polymerization conversion reached 99% (after an elapse of time of 26 minute from the initiation of the polymerization), 10 g of 1,3-butadiene was further added over 2 minutes, and the polymerization was further conducted for 3 minutes. Thereafter, 1,540 mg of N,N-bis(trimethylsilyl)aminopropylmethyldiethoxysilane was added thereto, and a reaction was performed for 15 minutes to obtain a polymer solution containing a conjugated diene polymer.

In this connection, confirmation as to whether or not N,N-bis(trimethylsilyl)aminopropylmethyldiethoxysilane was bonded to the conjugated diene polymer was performed by measuring the remaining amount of N,N-bis(trimethylsilyl)-aminopropylmethyldiethoxysilane in the polymer solution by gas chromatography and performing the back calculation therefrom.

To the resulting conjugated diene polymer-containing polymer solution, 570 mg of maleic acid was added as an organic acid compound, and further, 2,6-di-tert-butyl-p-cresol was added. Then, desolventizing was performed by steam striping, followed by drying with a hot roll adjusted to a temperature of 110° C. to obtain a modified conjugated diene rubber A.

The polymerization formula of the modified conjugated diene rubber A is shown in Table 1, and properties of the modified conjugated diene rubber A obtained are shown in Table 2. Further, a rubber composition prepared according to a compounding formula shown in Table 3 using the modified conjugated diene rubber A was vulcanized, and physical properties were evaluated. The results thereof are shown in Table 4.

Example 2

Synthesis of Modified Conjugated Diene Rubber B and Evaluation Thereof

An autoclave reactor having an internal volume of 5 liters in which the atmosphere was replaced with nitrogen was charged with 2,500 g of cyclohexane, 25 g of tetrahydrofuran, 100 g of styrene and 390 g of 1,3-butadiene. After adjusting the temperature of contents in the reactor to 10° C., 335 mg of n-butyl lithium was added thereto to initiate polymerization. The polymerization was conducted under adiabatic conditions, and the maximum temperature reached 85° C. At the time when the polymerization conversion reached 99% (after an elapse of time of 26 minute from the initiation of the polymerization), 10 g of 1,3-butadiene was further added over 2 minutes, and the polymerization was further conducted for 3 minutes. Thereafter, 1,540 mg of N,N-bis(trimethylsilyl)aminopropylmethyldiethoxysilane was added thereto, and a reaction was performed for 15 minutes. To the polymer solution after the reaction, 2,6-ditert-butyl-p-cresol was added to obtain a polymer solution containing a conjugated diene polymer.

The resulting polymer solution containing the conjugated diene polymer was transferred to a 10-liter plastic bottle, and thereafter, 570 mg of maleic acid was added thereto as an organic acid compound. Then, desolventizing was performed by steam striping, followed by drying with a hot roll adjusted to a temperature of 110° C. to obtain a modified conjugated diene rubber B.

The polymerization formula of the modified conjugated diene rubber B is shown in Table 1, and properties of the modified conjugated diene rubber B obtained are shown in Table 2. Further, a rubber composition prepared according to a compounding formula shown in Table 3 using the modified conjugated diene rubber B was vulcanized, and physical properties were evaluated. The results thereof are shown in Table 4.

Example 3

Synthesis of Modified Conjugated Diene Rubber C and Evaluation Thereof

An autoclave reactor having an internal volume of 5 liters in which the atmosphere was replaced with nitrogen was charged with 2,500 g of cyclohexane, 25 g of tetrahydrofuran, 100 g of styrene and 390 g of 1,3-butadiene. After adjusting the temperature of contents in the reactor to 10° C., 335 mg of n-butyl lithium was added thereto to initiate polymerization. The polymerization was conducted under adiabatic conditions, and the maximum temperature reached 85° C. At the time when the polymerization conversion reached 99% (after an elapse of time of 26 minute from the initiation of the polymerization), 10 g of 1,3-butadiene was further added over 2 minutes, and the polymerization was further conducted for 3 minutes. Thereafter, 1,540 mg of N,N-bis(trimethylsilyl)aminopropylmethyldiethoxysilane was added thereto, and a reaction was performed for 15 minutes. To the polymer solution after the reaction, 2,6-di-tert-butyl-p-cresol was added, and then, desolventizing was performed by steam striping, followed by drying with a hot roll adjusted to a temperature of 110° C. to obtain a conjugated diene polymer.

The resulting conjugated diene polymer was dissolved in 3,000 g of cyclohexane, and 570 mg of maleic acid was added thereto as an organic acid compound. Then, desolventizing was performed again by steam striping, followed by drying with a hot roll adjusted to a temperature of 110° C. to obtain a modified conjugated diene rubber C.

The polymerization formula of the modified conjugated diene rubber C is shown in Table 1, and properties of the modified conjugated diene rubber C obtained are shown in Table 2. Further, a rubber composition prepared according to a compounding formula shown in Table 3 using the modified conjugated diene rubber C was vulcanized, and physical properties were evaluated. The results thereof are shown in Table 4.

Example 4

Synthesis of Modified Conjugated Diene Rubber D and Evaluation Thereof

A modified conjugated diene rubber D was obtained in the same manner as in Example 1 with the exception that 1140 mg of maleic acid was added as the organic acid compound.

The polymerization formula of the modified conjugated diene rubber D is shown in Table 1, and properties of the modified conjugated diene rubber D obtained are shown in Table 2. Further, a rubber composition prepared according to a compounding formula shown in Table 3 using the modified conjugated diene rubber D was vulcanized, and physical properties were evaluated. The results thereof are shown in Table 4.

Example 5

Synthesis of Modified Conjugated Diene Rubber E and Evaluation Thereof

A modified conjugated diene rubber E was obtained in the same manner as in Example 1 with the exception that 760 mg of maleic acid dichloride was added as an organic acid derivative. Various physical properties of the resulting modified conjugated diene polymer E are shown in the table.

The polymerization formula of the modified conjugated diene rubber E is shown in Table 1, and properties of the modified conjugated diene rubber E obtained are shown in Table 2. Further, a rubber composition prepared according to a compounding formula shown in Table 3 using the modified conjugated diene rubber E was vulcanized, and physical properties were evaluated. The results thereof are shown in Table 4.

Example 6

Synthesis of Modified Conjugated Diene Rubber F and Evaluation Thereof

A modified conjugated diene rubber F was obtained in the same manner as in Example 1 with the exception that 710 mg of dimethyl maleate was added as an organic acid derivative.

The polymerization formula of the modified conjugated diene rubber F is shown in Table 1, and properties of the modified conjugated diene rubber F obtained are shown in Table 2. Further, a rubber composition prepared according to a compounding formula shown in Table 3 using the modified conjugated diene rubber F was vulcanized, and physical properties were evaluated. The results thereof are shown in Table 4.

Example 7

Synthesis of Modified Conjugated Diene Rubber G and Evaluation Thereof

A modified conjugated diene rubber G was obtained in the same manner as in Example 1 with the exception that 490 mg of maleic anhydride was added as an organic acid derivative.

The polymerization formula of the modified conjugated diene rubber G is shown in Table 1, and properties of the modified conjugated diene rubber G obtained are shown in Table 2. Further, a rubber composition prepared according to a compounding formula shown in Table 3 using the modified conjugated diene rubber G was vulcanized, and physical properties were evaluated. The results thereof are shown in Table 4.

Example 8

Synthesis of Modified Conjugated Diene Rubber H and Evaluation Thereof

A modified conjugated diene rubber H was obtained in the same manner as in Example 1 with the exception that 1,700 mg of p-toluenesulfonic acid was added as the organic acid compound.

The polymerization formula of the modified conjugated diene rubber H is shown in Table 1, and properties of the modified conjugated diene rubber H obtained are shown in Table 2. Further, a rubber composition prepared according to a compounding formula shown in Table 3 using the modified conjugated diene rubber H was vulcanized, and physical properties were evaluated. The results thereof are shown in Table 4.

Example 9

Synthesis of Modified Conjugated Diene Rubber I and Evaluation Thereof

A modified conjugated diene rubber I was obtained in the same manner as in Example 1 with the exception that 1,880 mg of p-toluenesulfonic acid halide was added as an organic acid derivative.

The polymerization formula of the modified conjugated diene rubber I is shown in Table 1, and properties of the modified conjugated diene rubber I obtained are shown in Table 2. Further, a rubber composition prepared according to a compounding formula shown in Table 3 using the modified conjugated diene rubber I was vulcanized, and physical properties were evaluated. The results thereof are shown in Table 4.

Example 10

Synthesis of Modified Conjugated Diene Rubber J and Evaluation Thereof

A modified conjugated diene rubber J was obtained in the same manner as in Example 1 with the exception that 1,540 mg of p-toluenesulfinic acid was added as the organic acid compound.

The polymerization formula of the modified conjugated diene rubber J is shown in Table 1, and properties of the modified conjugated diene rubber J obtained are shown in Table 2. Further, a rubber composition prepared according to a compounding formula shown in Table 3 using the modified conjugated diene rubber J was vulcanized, and physical properties were evaluated. The results thereof are shown in Table 4.

Example 11

Synthesis of Modified Conjugated Diene Rubber K and Evaluation Thereof

A modified conjugated diene rubber K was obtained in the same manner as in Example 1 with the exception that 780 mg of phenylphosphonic acid was added as the organic acid compound.

The polymerization formula of the modified conjugated diene rubber K is shown in Table 1, and properties of the modified conjugated diene rubber K obtained are shown in Table 2. Further, a rubber composition prepared according to a compounding formula shown in Table 3 using the modified conjugated diene rubber K was vulcanized, and physical properties were evaluated. The results thereof are shown in Table 4.

Example 12

Synthesis of Modified Conjugated Diene Rubber L and Evaluation Thereof

A modified conjugated diene rubber L was obtained in the same manner as in Example 1 with the exception that 1,060 mg of diethyl phenylphosphonate was added as an organic acid derivative.

The polymerization formula of the modified conjugated diene rubber L is shown in Table 1, and properties of the modified conjugated diene rubber L obtained are shown in Table 2. Further, a rubber composition prepared according to a compounding formula shown in Table 3 using the modified conjugated diene rubber L was vulcanized, and physical properties were evaluated. The results thereof are shown in Table 4.

Example 13

Synthesis of Modified Conjugated Diene Rubber M and Evaluation Thereof

A modified conjugated diene rubber M was obtained in the same manner as in Example 1 with the exception that 1,400 mg of phenylphosphinic acid was added as the organic acid compound.

The polymerization formula of the modified conjugated diene rubber M is shown in Table 1, and properties of the modified conjugated diene rubber M obtained are shown in Table 2. Further, a rubber composition prepared according to a compounding formula shown in Table 3 using the modified conjugated diene rubber M was vulcanized, and physical properties were evaluated. The results thereof are shown in Table 4.

Comparative Example 1

Synthesis of Modified Conjugated Diene Rubber N and Evaluation Thereof

An autoclave reactor having an internal volume of 5 liters in which the atmosphere was replaced with nitrogen was charged with 2,500 g of cyclohexane, 25 g of tetrahydrofuran, 100 g of styrene and 390 g of 1,3-butadiene. After adjusting the temperature of contents in the reactor to 10° C., 335 mg of n-butyl lithium was added thereto to initiate polymerization. The polymerization was conducted under adiabatic conditions, and the maximum temperature reached 85° C. At the time when the polymerization conversion reached 99% (after an elapse of time of 26 minutes from the initiation of the polymerization), 10 g of 1,3-butadiene was further added over 2 minutes, and the polymerization was further conducted for 3 minutes. Thereafter, 1,540 mg of N,N-bis(trimethylsilyl)aminopropylmethyldiethoxysilane was added thereto, and a reaction was performed for 15 minutes to obtain a polymer solution containing a conjugated diene polymer.

To the resulting polymer solution containing the conjugated diene polymer, 420 mg of silicon tetrachloride was added as an inorganic acid, and further, 2,6-di-tert-butyl-p-cresol was added. Then, desolventizing was performed by steam striping, followed by drying with a hot roll adjusted to a temperature of 110° C. to obtain a modified conjugated diene rubber N.

The polymerization formula of the modified conjugated diene rubber N is shown in Table 1, and properties of the modified conjugated diene rubber N obtained are shown in Table 2. Further, a rubber composition prepared according to a compounding formula shown in Table 3 using the modified conjugated diene rubber N was vulcanized, and physical properties were evaluated. The results thereof are shown in Table 4.

Comparative Example 2

Synthesis of Modified Conjugated Diene Rubber O and Evaluation Thereof

An autoclave reactor having an internal volume of 5 liters in which the atmosphere was replaced with nitrogen was charged with 2,500 g of cyclohexane, 25 g of tetrahydrofuran, 100 g of styrene and 390 g of 1,3-butadiene. After adjusting the temperature of contents in the reactor to 10° C., 335 mg of n-butyl lithium was added thereto to initiate polymerization. The polymerization was conducted under adiabatic conditions, and the maximum temperature reached 85° C. At the time when the polymerization conversion reached 99% (after an elapse of time of 26 minute from the initiation of the polymerization), 10 g of 1,3-butadiene was further added over 2 minutes, and the polymerization was further conducted for 3 minutes. Thereafter, 1,660 mg of 3-(4-trimethylsilyl-1-piperazino)propyltriethoxysilane was added thereto, and a reaction was performed for 15 minutes to obtain a polymer solution containing a conjugated diene polymer.

To the resulting polymer solution containing the conjugated diene polymer, 850 mg of maleic acid was added as an organic acid compound, and further, 2,6-di-tert-butyl-p-cresol was added. Then, desolventizing was performed by steam striping, followed by drying with a hot roll adjusted to a temperature of 110° C. to obtain a modified conjugated diene rubber O.

The polymerization formula of the modified conjugated diene rubber O is shown in Table 1, and properties of the modified conjugated diene rubber O obtained are shown in Table 2. Further, a rubber composition prepared according to a compounding formula shown in Table 3 using the modified conjugated diene rubber O was vulcanized, and physical properties were evaluated. The results thereof are shown in Table 4.

Comparative Example 3

Synthesis of Modified Conjugated Diene Rubber P and Evaluation Thereof

An autoclave reactor having an internal volume of 5 liters in which the atmosphere was replaced with nitrogen was charged with 2,500 g of cyclohexane, 25 g of tetrahydrofuran, 100 g of styrene and 390 g of 1,3-butadiene. After the temperature of contents in the reactor was adjusted to 10° C., 335 mg of n-butyl lithium was added thereto to initiate polymerization. The polymerization was conducted under adiabatic conditions, and the maximum temperature reached 85° C. At the time when the polymerization conversion reached 99% (after an elapse of time of 26 minute from the initiation of the polymerization), 10 g of 1,3-butadiene was further added over 2 minutes, and the polymerization was further conducted for 3 minutes. Thereafter, 1,400 mg of 3-(4-methyl-1-piperazino)propyltriethoxysilane was added thereto, and a reaction was performed for 15 minutes to obtain a polymer solution containing a conjugated diene polymer.

To the resulting polymer solution containing the conjugated diene polymer, 850 mg of maleic acid was added as an organic acid compound, and further, 2,6-di-tert-butyl-p-cresol was added. Then, desolventizing was performed by steam striping, followed by drying with a hot roll adjusted to a temperature of 110° C. to obtain a modified conjugated diene rubber P.

The polymerization formula of the modified conjugated diene rubber P is shown in Table 1, and properties of the modified conjugated diene rubber P obtained are shown in Table 2. Further, a rubber composition prepared according to a compounding formula shown in Table 3 using the modified conjugated diene rubber P was vulcanized, and physical properties were evaluated. The results thereof are shown in Table 4.

[Method for Kneading Rubber Composition and Characteristic Evaluation]

Using a plastomill (internal volume: 250 cc) equipped with a temperature controller, the modified conjugated diene rubber obtained in each of Examples and Comparative Examples was kneaded with polybutadiene rubber, an extender oil, carbon black, silica, a silane coupling agent, stearic acid, an anti-aging agent and zinc oxide according to the compounding formula shown in Table 3 under conditions of a filling rate of 72% and a rotation number of 60 rpm, as first-step kneading. Then, the composition obtained above was cooled to room temperature, and thereafter kneaded with sulfur and a vulcanizing accelerator according to the compounding formula shown in Table 3, as second-step kneading. This was molded, and vulcanized at 160° C. for a predetermined time by means of a vulcanizing press. Evaluation of characteristics representing the following tire performances was performed.

(i) Mooney viscosity: The rubber composition before vulcanization was used as a sample for measurement, and the measurement was made in accordance with JIS K6300 using an L-rotor under conditions of preheating for 1 minute, rotor operation for 4 minutes and a temperature of 100° C.

(ii) Tensile strength: A 300% modulus was measured in accordance with JIS K6301. The value is indicated by the index taking Comparative Example 1 as 100. The larger value shows the larger and better tensile strength.

(iii) Workability: After the first-step kneading, 6-inch rolls were set to a temperature of 50° C., a speed ratio of 20 rpm/20 rpm and a thickness of 2 mm, and a compound sheet allowed to pass between the rolls three times was visually judged to give the grade as follows:

Grade 3: There is no unevenness on a surface texture of the compound sheet, and edges thereof are also sharp.

Grade 2: Intermediate between 1 and 3.

Grade 1: There is unevenness on a surface texture of the compound sheet, and edges thereof are also serrated.

(iv) 0° C. tan δ: The vulcanized rubber was used as a sample for measurement, and the measurement was made under conditions of a tensile dynamic distortion of 0.14%, an angular velocity of 100 radians per second and a temperature of 0° C., using a dynamic spectrometer (manufactured by US Rheometric Inc.). The value is indicated by the index taking Comparative Example 1 as 100. The larger value shows the larger and better wet skid resistance.

(v) 70° C. tan δ: The vulcanized rubber was used as a sample for measurement, and the measurement was made under conditions of a tensile dynamic distortion was 0.7%, an angular velocity of 100 radians per second and a temperature of 70° C., using a dynamic spectrometer (made by US Rheometric Inc.). The value is indicated by the index taking Comparative Example 1 as 100. The larger value shows the smaller and better low hysteresis loss property.

(vi) Wear resistance: The vulcanized rubber was used as a sample for measurement, and the measurement was made under a load of 10 N at 25° C., in accordance with JIS K 6264, using a DIN abrasion tester (manufactured by Toyo Seiki Seisaku-Sho, Ltd.). The value is indicated by the index taking Comparative Example 1 as 100. The larger value shows the better wear resistance.

As apparent from Table 2, it has been confirmed that the modified conjugated diene rubber N of Comparative Example 1 in which the inorganic acid is used is extremely poor in temporal stability to cause a problem in storage stability of the rubber.

Further, as apparent from Table 2 and Table 4, it is found that the compositions of the present invention using the modified conjugated diene rubbers of the present invention are significantly improved in a balance among workability, wet skid resistance and low hysteresis loss property.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Kind of Modified Conjugated Diene Rubber |  | A | B | C | D | E | F | G | H | I |
| Polymerization Formula Solvent |  |  |  |  |  |  |  |  |  |  |
| Cyclohexane | (g) | 2500 | 2500 | 2500 | 2500 | 2500 | 2500 | 2500 | 2500 | 2500 |
| Randomizer |  |  |  |  |  |  |  |  |  |  |
| Tetrahydrofuran | (g) | 25 | 25 | 25 | 25 | 25 | 25 | 25 | 25 | 25 |
| Polymerization Monomer |  |  |  |  |  |  |  |  |  |  |
| Styrene | (g) | 100 | 100 | 100 | 100 | 100 | 100 | 100 | 100 | 100 |
| 1,3-Butadiene | (g) | 390 | 390 | 390 | 390 | 390 | 390 | 390 | 390 | 390 |
| Additionally Added Butadien | (g) | 10 | 10 | 10 | 10 | 10 | 10 | 10 | 10 | 10 |
| Polymerization Initiator |  |  |  |  |  |  |  |  |  |  |
| n-Butyl lithium | (mg) | 335 | 335 | 335 | 335 | 335 | 335 | 335 | 335 | 335 |
| Hydrocarbyloxysilyl Compound |  |  |  |  |  |  |  |  |  |  |
| N—Si-1 | *1 (mg) | 1540 | 1540 | 1540 | 1540 | 1540 | 1540 | 1540 | 1540 | 1540 |
| N—Si-2 | *2 (mg) | — | — | — | — | — | — | — | — | — |
| N—Si-3 | *3 (mg) | — | — | — | — | — | — | — | — | — |
| Organic Acid Compound and Organic Acid Derivative |  |  |  |  |  |  |  |  |  |  |
| C—OH-1 | *4 (mg) | 570 | 570 | 570 | 1140 | — | — | — | — | — |
| C—Cl-1 | *5 (mg) | — | — | — | — | 760 | — | — | — | — |
| C—O—C-1 | *6 (mg) | — | — | — | — | — | 710 | — | — | — |
| C—O—O—C-1 | *7 (mg) | — | — | — | — | — | — | 490 | — | — |
| S—OH-1 | *8 (mg) | — | — | — | — | — | — | — | 1700 | — |
| S Cl-1 | *9 (mg) | — | — | — | — | — | — | — | — | 1880 |
| S—OH-2 | *10 (mg) | — | — | — | — | — | — | — | — | — |
| P—OH-1 | *11 (mg) | — | — | — | — | — | — | — | — | — |
| P—O—C-1 | *12 (mg) | — | — | — | — | — | — | — | — | — |
| P—OH-2 | *13 (mg) | — | — | — | — | — | — | — | — | — |
| Si—Cl-1 | *14 (mg) | — | — | — | — | — | — | — | — | — |

|  |  | Example 10 | Example 11 | Example 12 | Example 13 | Comparative Example 1 | Comparative Example 2 | Comparative Example 3 |
|---|---|---|---|---|---|---|---|---|
| Kind of Modified Conjugated Diene Rubber |  | J | K | L | M | N | O | P |
| Polymerization Formula Solvent |  |  |  |  |  |  |  |  |
| Cyclohexane | (g) | 2500 | 2500 | 2500 | 2500 | 2500 | 2500 | 2500 |
| Randomizer |  |  |  |  |  |  |  |  |
| Tetrahydrofuran | (g) | 25 | 25 | 25 | 25 | 25 | 25 | 25 |
| Polymerization Monomer |  |  |  |  |  |  |  |  |
| Styrene | (g) | 100 | 100 | 100 | 100 | 100 | 100 | 100 |
| 1,3-Butadiene | (g) | 390 | 390 | 390 | 390 | 390 | 390 | 390 |
| Additionally Added Butadien | (g) | 10 | 10 | 10 | 10 | 10 | 10 | 10 |
| Polymerization Initiator |  |  |  |  |  |  |  |  |
| n-Butyl lithium | (mg) | 335 | 335 | 335 | 335 | 335 | 335 | 335 |

TABLE 1-continued

|  |  |  |  |  |  |  |  |  |
|---|---|---|---|---|---|---|---|---|
| Hydrocarbyloxysilyl Compound |  |  |  |  |  |  |  |  |
| N—Si-1 | *1 (mg) | 1540 | 1540 | 1540 | 1540 | 1540 | — | — |
| N—Si-2 | *2 (mg) | — | — | — | — | — | 1660 | — |
| N—Si-3 | *3 (mg) | — | — | — | — | — | — | 1400 |
| Organic Acid Compound and Organic Acid Derivative |  |  |  |  |  |  |  |  |
| C—OH-1 | *4 (mg) | — | — | — | — | — | 850 | 850 |
| C—Cl-1 | *5 (mg) | — | — | — | — | — | — | — |
| C—O—C-1 | *6 (mg) | — | — | — | — | — | — | — |
| C—O—O—C-1 | *7 (mg) | — | — | — | — | — | — | — |
| S—OH-1 | *8 (mg) | — | — | — | — | — | — | — |
| S Cl-1 | *9 (mg) | — | — | — | — | — | — | — |
| S—OH-2 | *10 (mg) | 1540 | — | — | — | — | — | — |
| P—OH-1 | *11 (mg) | — | 780 | — | — | — | — | — |
| P—O—C-1 | *12 (mg) | — | — | 1060 | — | — | — | — |
| P—OH-2 | *13 (mg) | — | — | — | 1400 | — | — | — |
| Si—Cl-1 | *14 (mg) | — | — | — | — | 420 | — | — |

*1 N,N-Bis(trimethylsilyl)aminopropylmethyldiethoxysilane
*2 3-(4-Trimethylsilyl-1-piperazino)propyltriethoxysilane
*3 3-(4-methyl-1-piperazino)propyltriethoxysilane
*4 Maleic acid
*5 Maleic acid dichloride
*6 Dimethyl maleate
*7 Maleic anhydride
*8 p-Toluenesulfonic acid
*9 p-Toluenesulfonic acid halide
*10 p-Toluenesulfinic acid
*11 Phenylphosphonic acid
*12 Diethyl phenylphosphonate
*13 Phenylphosphinic acid
*14 Silicon tetrachloride

TABLE 2

|  |  | Example 1 | Example 2 | Example 3 | Example 4 | Example 5 | Example 6 | Example 7 | Example 8 | Example 9 |
|---|---|---|---|---|---|---|---|---|---|---|
| Kind of Modified Conjugated Diene Rubber |  | A | B | C | D | E | F | G | H | I |
| Styrene Unit Amount | (%) | 20 | 20 | 20 | 20 | 20 | 20 | 20 | 20 | 20 |
| Vinyl Content | (%) | 55 | 55 | 55 | 55 | 55 | 55 | 55 | 55 | 55 |
| Weight Average Molecular Weight before Modification (ten thousand) |  | 21 | 20 | 20 | 20 | 19 | 20 | 20 | 20 | 19 |
| Mooney Viscosity (ML1 + 4, 100° C.) |  | 67 | 64 | 64 | 69 | 65 | 62 | 63 | 68 | 64 |
| Cold Flow Value | (mg/min) | 0.1 | 0.2 | 0.2 | 0.2 | 0.2 | 0.2 | 0.2 | 0.2 | 0.2 |
| Temporal Stability | (ΔML1 + 4, 100° C.) | 1 | 1 | 1 | 2 | 2 | 1 | 1 | 2 | 2 |

|  |  | Example 10 | Example 11 | Example 12 | Example 13 | Comparative Example 1 | Comparative Example 2 | Comparative Example 3 |
|---|---|---|---|---|---|---|---|---|
| Kind of Modified Conjugated Diene Rubber |  | J | K | L | M | N | O | P |
| Styrene Unit Amount | (%) | 20 | 20 | 20 | 20 | 20 | 20 | 20 |
| Vinyl Content | (%) | 55 | 55 | 55 | 55 | 55 | 55 | 55 |
| Weight Average Molecular Weight before Modification (ten thousand) |  | 20 | 20 | 20 | 20 | 20 | 20 | 19 |
| Mooney Viscosity (ML1 + 4, 100° C.) |  | 64 | 65 | 63 | 63 | 65 | 55 | 50 |
| Cold Flow Value | (mg/min) | 0.2 | 0.2 | 0.2 | 0.2 | 0.2 | 0.4 | 0.7 |
| Temporal Stability | (ΔML1 + 4, 100° C.) | 2 | 1 | 2 | 2 | 10 | 3 | 5 |

TABLE 3

| Compounding Formula | Parts by mass |
|---|---|
| Modified Conjugated Diene Rubber | 70 |
| Polybutadiene Rubber *1 | 30 |
| Extender Oil *2 | 37.5 |
| Silica *3 | 70 |
| Carbon Black *4 | 5.6 |
| Silane Coupling Agent *5 | 5.6 |
| Stearic Acid | 2 |
| Anti-Aging Agent *6 | 1 |
| Zinc Oxide | 3 |
| Vulcanizing Accelerator D *7 | 1.5 |
| Vulcanizing Accelerator CZ *8 | 1.8 |
| Sulfur | 1.5 |

*1: BR01 manufactured by JSR Corporation
*2: JOMO Process NC-140 manufactured by Japan Energy Corporation
*3: ZEOSIL 1165MP manufactured by Rhodia Inc.
*4: Diablack N339 manufactured by Mitsubishi Chemical Corporation
*5: Si 75 manufactured by Evonik Industries AG
*6: Ozonon 6C manufactured by Seiko Chemical Co., Ltd.
*7: Nocceler D manufactured by Ouchi Shinko Chemical Industrial Co., Ltd.
*8: Nocceler CZ manufactured by Ouchi Shinko Chemical Industrial Co., Ltd.

TABLE 4

| | | Example 1 | Example 2 | Example 3 | Example 4 | Example 5 | Example 6 | Example 7 | Example 8 | Example 9 |
|---|---|---|---|---|---|---|---|---|---|---|
| Kind of Modified Conjugated Diene Rubber | | A | B | C | D | E | F | G | H | I |
| Mooney Viscosity (ML1 + 4, 100° C.) | | 58 | 56 | 57 | 57 | 60 | 57 | 57 | 61 | 61 |
| Workability | (grade) | 3 | 3 | 3 | 3 | 3 | 3 | 3 | 3 | 3 |
| Tensile Strength | (index) | 103 | 102 | 102 | 102 | 104 | 102 | 102 | 103 | 102 |
| 0° C. tan δ | (index) | 116 | 114 | 115 | 119 | 121 | 115 | 114 | 114 | 113 |
| 70° C. tan δ | (index) | 108 | 107 | 108 | 107 | 105 | 104 | 104 | 105 | 104 |
| Wear Resistance | (index) | 103 | 104 | 103 | 102 | 106 | 102 | 102 | 102 | 102 |

| | | Example 10 | Example 11 | Example 12 | Example 13 | Comparative Example 1 | Comparative Example 2 | Comparative Example 3 |
|---|---|---|---|---|---|---|---|---|
| Kind of Modified Conjugated Diene Rubber | | J | K | L | M | P | N | O |
| Mooney Viscosity (ML1 + 4, 100° C.) | | 63 | 63 | 64 | 65 | 76 | 68 | 65 |
| Workability | (grade) | 2 | 3 | 3 | 2 | 1 | 3 | 3 |
| Tensile Strength | (index) | 104 | 102 | 102 | 102 | 100 | 100 | 98 |
| 0° C. tan δ | (index) | 115 | 116 | 111 | 112 | 100 | 105 | 103 |
| 70° C. tan δ | (index) | 106 | 105 | 105 | 105 | 100 | 102 | 101 |
| Wear Resistance | (index) | 103 | 102 | 104 | 103 | 100 | 101 | 100 |

The invention claimed is:

1. A method comprising:
reacting a conjugated diene polymer with a hydrocarbyloxysilane compound having one or more functional groups (I) and one or more a functional groups (II) in a molecule thereof to obtain a modified conjugated diene polymer containing the functional group (II), wherein the conjugate diene polymer comprises a structural unit derived from a conjugated diene compound and optionally a structural unit derived from an aromatic vinyl compound, and further comprises an alkali metal or alkaline-earth metal active end, the functional group (I) is a hydrocarbyloxysilyl group, and the functional group (II) is a nitrogen-containing group in which both of two hydrogen atoms of a primary amino group are substituted with a protective group; and
mixing the modified conjugated diene polymer and at least one compound selected from the group consisting of an organic acid, an organic acid halide, and a carboxylic anhydride to obtain a modified conjugated diene rubber.

2. The method according to claim 1, wherein the at least one compound is selected from the group consisting of a carboxylic acid, a carboxylic anhydride, a carboxylic halide, an organic phosphoric acid, an organic phosphoric acid halide, an organic phosphorous acid, an organic phosphorous acid halide, an organic sulfonic acid, an organic sulfonic acid halide, an organic sulfinic acid, an organic sulfinic acid halide, and an organic thio acid.

3. The method according to claim 1, further comprising:
bringing the modified conjugated diene rubber into contact with water.

4. The method according to claim 1,
wherein the modified conjugated diene rubber has an onium structure formed by the modified conjugated diene polymer.

5. A modified conjugated diene rubber obtained by the method according to claim 1.

6. A rubber composition, comprising:
the modified conjugated diene rubber according to claim 5,
silica and/or carbon black, and
a cross-linking agent.

7. A cross-linked rubber obtained by a process comprising cross-linking the rubber composition according to claim 6.

8. A tire, comprising the cross-linked rubber according to claim 7.

9. The method according to claim 1, further comprising:
performing an anionic polymerization of the conjugated diene compound and optionally the aromatic vinyl compound in a presence of an alkali metal- or alkaline-earth metal-based polymerization initiator to obtain the conjugate diene polymer.

10. The method according to claim 1, wherein the alkali metal or alkaline-earth metal active end comprises lithium.

11. The method according to claim 1, wherein the conjugated diene compound is 1,3-butadiene.

12. The method according to claim 1, wherein the aromatic vinyl compound is styrene.

13. The method according to claim 1, wherein an amount of the at least one compound mixed with the modified conjugated diene polymer is 1.0 molar equivalent or more based on alkali components present in a reaction system.

14. The method according to claim 1, wherein an amount of the at least one compound mixed with the modified conjugated diene polymer is 1.5 molar equivalent or more based on alkali components present in a reaction system.

15. The method according to claim 1, wherein a temperature of mixing the modified conjugated diene polymer and the at least one compound is from 0 to 120° C.

16. The method according to claim 1, wherein a temperature of mixing the modified conjugated diene polymer and the at least one compound is from 20 to 100° C.

* * * * *

UNITED STATES PATENT AND TRADEMARK OFFICE
CERTIFICATE OF CORRECTION

PATENT NO. : 9,434,792 B2  
APPLICATION NO. : 14/114123  
DATED : September 6, 2016  
INVENTOR(S) : Hiroyuki Morita et al.

Page 1 of 1

It is certified that error appears in the above-identified patent and that said Letters Patent is hereby corrected as shown below:

In the Claims

Column 38, Lines 7 and 8, Claim 2, "an organic sulfinic acid, an organic sulfonic acid halide," should read -- an organic sulfinic acid, an organic sulfinic acid halide, --.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*